US012658104B2

(12) United States Patent
Kim et al.

(10) Patent No.: US 12,658,104 B2
(45) Date of Patent: Jun. 16, 2026

(54) STAGE CIRCUIT, DISPLAY DEVICE INCLUDING THE STAGE CIRCUIT, AND ELECTRONIC DEVICE INCLUDING THE DISPLAY DEVICE

(71) Applicant: Samsung Display Co., LTD., Yongin-si (KR)

(72) Inventors: Kyung Ho Kim, Yongin-si (KR); Gi Chang Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/440,387

(22) Filed: Feb. 13, 2024

(65) Prior Publication Data

US 2025/0022404 A1 Jan. 16, 2025

(30) Foreign Application Priority Data

Jul. 13, 2023 (KR) ........................ 10-2023-0091137

(51) Int. Cl.
*G09G 3/32* (2016.01)

(52) U.S. Cl.
CPC ....... *G09G 3/32* (2013.01); *G09G 2310/0267* (2013.01); *G09G 2310/0286* (2013.01); *G09G 2330/021* (2013.01)

(58) Field of Classification Search
CPC ............. G09G 3/32; G09G 2310/0267; G09G 2310/0286; G09G 2330/021
See application file for complete search history.

(56) References Cited

U.S. PATENT DOCUMENTS

| | | | | |
|---|---|---|---|---|
| 9,449,558 | B2 | 9/2016 | Choi | |
| 10,629,133 | B2 * | 4/2020 | Kim | G09G 3/3233 |
| 2011/0187691 | A1 * | 8/2011 | Chung | G09G 5/00 345/204 |
| 2019/0035322 | A1 * | 1/2019 | Kim | H10D 86/60 |
| 2020/0394963 | A1 * | 12/2020 | Jung | H10K 59/131 |
| 2021/0225256 | A1 * | 7/2021 | Byun | G11C 19/28 |

FOREIGN PATENT DOCUMENTS

| | | |
|---|---|---|
| KR | 10-2016-0003364 | 1/2016 |
| KR | 10-2021-0083918 | 7/2021 |
| KR | 10-2367271 | 2/2022 |

* cited by examiner

*Primary Examiner* — Towfiq Elahi
(74) *Attorney, Agent, or Firm* — Sughrue Mion, PLLC

(57) ABSTRACT

A stage circuit that includes a driver configured to receive a start signal and generate a first signal and an inverted first signal using a first clock signal and a second clock signal, and a first generator configured to generate a second signal using a previous stage first signal and a previous stage inverted first signal supplied from a driver of a previous stage circuit, and a next stage first signal supplied from a driver of a next stage circuit. The driver and the first generator may be electrically connected to a first power input terminal to which first power is may be input and a second power input terminal to which second power is may be input.

20 Claims, 17 Drawing Sheets

STAGE CIRCUIT, DISPLAY DEVICE INCLUDING THE STAGE CIRCUIT, AND ELECTRONIC DEVICE INCLUDING THE DISPLAY DEVICE

CROSS-REFERENCE TO RELATED APPLICATIONS

This application claims priority under 35 U.S.C. § 119 from Korean Patent Application No. 10-2023-0091137 filed on Jul. 13, 2023 in the Korean Intellectual Property Office (KIPO), the entire contents of which are incorporated herein by reference.

BACKGROUND

1. Technical Field

The disclosure relates to a stage circuit, a display device including the stage circuit, and an electronic device including the display device.

2. Description of the Related Art

As information society develops, a demand for a display device for displaying an image is increasing in various forms. For example, the display device is applied to various electronic devices such as a smart phone, a digital camera, a notebook computer, a navigation device, and a smart television.

The display device displays an image using pixels. The display device may include multiple scan drivers and emission drivers to drive the pixels.

SUMMARY

In order to drive a display device at a high driving frequency and minimize power consumption, pixels may include a P-type transistor (for example, a PMOS) and an N-type transistor (for example, an NMOS).

When the pixels include the P-type transistor and the N-type transistor, multiple drivers may be included in the display device to drive the pixels, and thus a dead space may be increased. In case that the drivers are included in the display device, power consumption may increase.

An object of the disclosure is to provide a stage circuit capable of reducing a dead space and power consumption, a display device including the stage circuit, and an electronic device including the display device.

According to embodiments of the disclosure, a stage circuit may include a driver configured to receive a start signal and generate a first signal and an inverted first signal using a first clock signal, and a second clock signal, and a first generator configured to generate a second signal using a previous stage first signal and a previous stage inverted first signal supplied from a driver of a previous stage circuit, and a next stage first signal supplied from a driver of a next stage circuit. The driver and the first generator may be electrically connected to a first power input terminal to which first power is input and a second power input terminal to which second power is input.

According to an embodiment, the first clock signal and the second clock signal may have a same period and opposite phases.

According to an embodiment, the driver may include an input portion controlling a voltage of a first node using the start signal, the first clock signal, and the second clock signal, a first output portion electrically connected to the first power input terminal and the second power input terminal and controlling a voltage of a first output terminal in response to the voltage of the first node, and a second output portion electrically connected to the first power input terminal and the second power input terminal and controlling a voltage of a second output terminal in response to the voltage of the first output terminal.

According to an embodiment, the first output terminal may output the inverted first signal, and the second output terminal may output the first signal.

According to an embodiment, the input portion may include a first transistor and a second transistor electrically connected in parallel between a first input terminal to which the start signal is input and the first node, a gate electrode of the first transistor may be electrically connected to a second input terminal to which the first clock signal is input, and a gate electrode of the second transistor may be electrically connected to a third input terminal to which the second clock signal is input.

According to an embodiment, the first transistor may be an N-type transistor and the second transistor may be a P-type transistor.

According to an embodiment, each of the first output portion and the second output portion may be an inverter.

According to an embodiment, the first output portion may include a third transistor and a fourth transistor disposed in series between the first power input terminal and the second power input terminal, the third transistor may be a P-type transistor, and the fourth transistor may be an N-type transistor, a gate electrode of the third transistor and the fourth transistor may be electrically connected to the first node, and a common node between the third transistor and the fourth transistor may be electrically connected to the first output terminal.

According to an embodiment, the second output portion may include a fifth transistor and a sixth transistor disposed in series between the first power input terminal and the second power input terminal, the fifth transistor may be a P-type transistor, and the sixth transistor may be an N-type transistor, a gate electrode of the fifth transistor and the sixth transistor may be electrically connected to the first output terminal, and a common node between the fifth transistor and the sixth transistor may be electrically connected to the second output terminal.

According to an embodiment, the stage circuit may further include a first capacitor electrically connected between the first node and the second power input terminal.

According to an embodiment, the first generator may include a controller controlling a voltage of a first node using a first input signal supplied to a first signal input terminal and a second input signal supplied to a second signal input terminal, and an output portion outputting the second signal to an output terminal in response to a third input signal supplied to a third signal input terminal and the voltage of the first node.

According to an embodiment, the first input signal may be the next stage first signal, the second input signal may be the previous stage inverted first signal, and the third input signal may be the previous stage first signal.

According to an embodiment, the controller may include a first transistor electrically connected between the first power input terminal and the first node and having a gate electrode electrically connected to the first signal input terminal, the first transistor may be P-type, and a second transistor electrically connected between the first node and the second power input terminal and having a gate electrode electrically connected to the second signal input terminal, the second transistor may be N-type.

According to an embodiment, the output portion may include a third transistor electrically connected between the first power input terminal and the output terminal and having a gate electrode electrically connected to the third signal input terminal, the third transistor may be P-type, and a fourth transistor electrically connected between the output terminal and the second power input terminal and having a gate electrode electrically connected to the first node, the fourth transistor may be N-type.

According to an embodiment, the output portion may further include a second capacitor electrically connected between the first node and the second power input terminal.

According to an embodiment, the first power may be set to a high level voltage, and the second power may be set to a low level voltage which is a voltage lower than that of the first power.

According to an embodiment, the stage circuit may further include a second generator, the second generator and the first generator may include a same circuit, and the second generator may be configured to output a third signal using a fourth input signal input to a fourth signal input terminal, a fifth input signal input to a fifth signal input terminal, and a sixth input signal input to a sixth signal input terminal.

According to an embodiment, the fourth input signal may be different from the first input signal, the fifth input signal may be different from the second input signal, and the sixth input signal may be different from the third input signal.

According to an embodiment of the disclosure, a display device may include a plurality of pixels electrically connected to a plurality of scan lines, a plurality of emission control lines, and a plurality of data lines, and a scan/emission driver including a plurality of stage circuits configured to drive at least one of the plurality of scan lines and at least one of the plurality of emission control lines, a plurality of first dummy stage circuits positioned at a front stage of the plurality of stage circuits, and a plurality of second dummy stage circuit positioned at a back stage of the plurality of stage circuits. An i-th stage circuit among the plurality of stage circuits may include a driver configured to receive a start signal and generate a first signal and an inverted first signal using a first clock signal, and a second clock signal, and a generator configured to generate a second signal using a previous stage first signal and a previous stage inverted first signal supplied from a driver of a previous stage circuit, and a next stage first signal supplied from a driver of a next stage circuit. The start signal may be a first signal of an (i−1)-th stage circuit, the first signal may be a first scan signal supplied to an i-th first scan line, and the second signal may be a second signal supplied to an i-th second scan line or an emission control signal supplied to an i-th emission control line.

According to an embodiment of the disclosure, an electronic device may include a display module including a gate driver and a display panel that includes a plurality of pixels that display an image, a processor configured to supply data corresponding to the image to the display module, wherein the gate driver may include a plurality of stage circuits, and a plurality of first dummy stage circuits positioned at a front stage of the plurality of stage circuits, and a plurality of second dummy stage circuits positioned at a back stage of the plurality of stage circuits to supply at least one of a scan signal and an emission control signal to the plurality of pixels included in the display panel. An i-th stage circuit among the plurality of stage circuits may include a driver configured to receive a start signal and generate a first signal and an inverted first signal using a first clock signal and a second clock signal, and a generator configured to generate a second signal using a previous stage first signal and a previous stage inverted first signal supplied from a driver of a previous stage circuit, and a next stage first signal supplied from a driver of a next stage circuit. The start signal may be a first signal of an (i−1)-th stage circuit, the first signal may be a first scan signal supplied to an i-th first scan line, and the second signal may be a second signal supplied to an i-th second scan line or an emission control signal supplied to an i-th emission control line.

Objects of the disclosure may not be limited to the object described above, and other technical objects which may not be described will be clearly understood by those skilled in the art from the following description.

In accordance with the stage circuit, the display device including the stage circuit, and the electronic device including the display device according to embodiments of the disclosure, a first signal of a low level and a second signal of a high level may be generated using one stage circuit.

In an embodiment of the disclosure, signals driving a P-type transistor and an N-type transistor may be generated using a stage circuit, and thus a dead space may be minimized.

However, an effect of the disclosure may not be limited to the above-described effect, and may be variously extended within a range that does not deviate from the spirit and scope of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENTS

Figure 1:
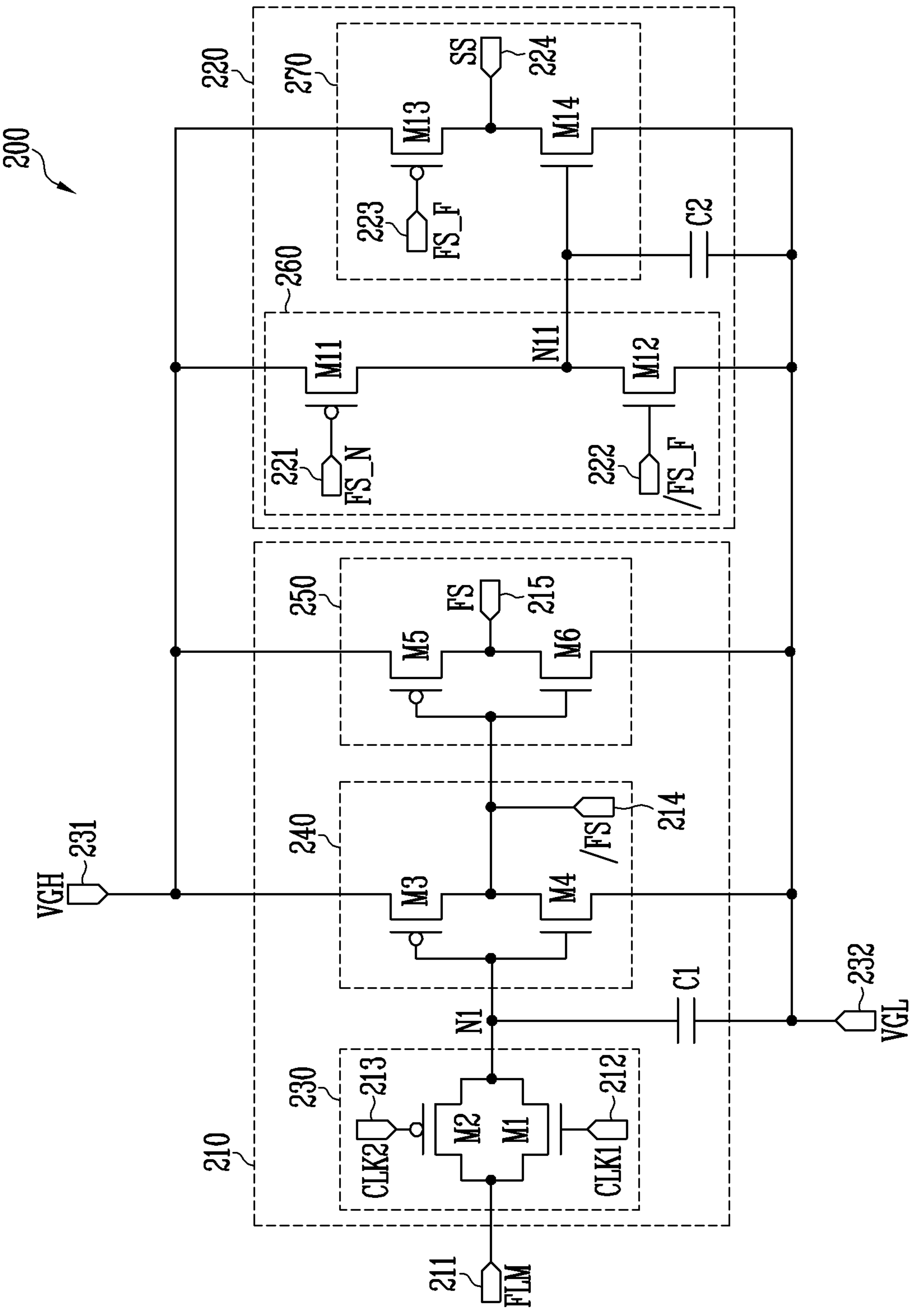
FIG. 1 is a schematic diagram illustrating a stage circuit according to an embodiment of the disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals and/or reference characters denote like elements.

The term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

FIG. 1 is a diagram illustrating a stage circuit according to an embodiment of the disclosure.

Referring to FIG. 1, the stage circuit 200 according to an embodiment of the disclosure may include a driver 210 and a generator 220.

The driver 210 and the generator 220 may be electrically connected to a first power input terminal 231 and a second power input terminal 232. The first power input terminal 231 may receive first power VGH, and the second power input terminal 232 may receive second power VGL. Here, the first power VGH may be set to a voltage higher than that of the second power VGL.

For example, the voltage of the first power VGH may be set to a gate-off voltage of a P-type transistor and a gate-on voltage of an N-type transistor. For example, the voltage of the second power VGL may be set to a gate-on voltage of a P-type transistor and a gate-off voltage of an N-type transistor.

The driver 210 may output a first signal FS for driving a first type (for example, P-type) transistor. To this end, the driver 210 may include an input portion 230, a first output portion 240, a second output portion 250, and a first capacitor C1.

The input portion 230 may be electrically connected to a first input terminal 211, a second input terminal 212, and a third input terminal 213. The first input terminal 211 may receive a start signal FLM, second input terminal 212 may receive a first clock signal CLK1, and the third input terminal 213 may receive a second clock signal CLK2.

The start signal FLM may be supplied from a timing controller which may not be shown. The start signal FLM may be an output signal (or a first signal) of a driver of a previous stage.

Figure 2:
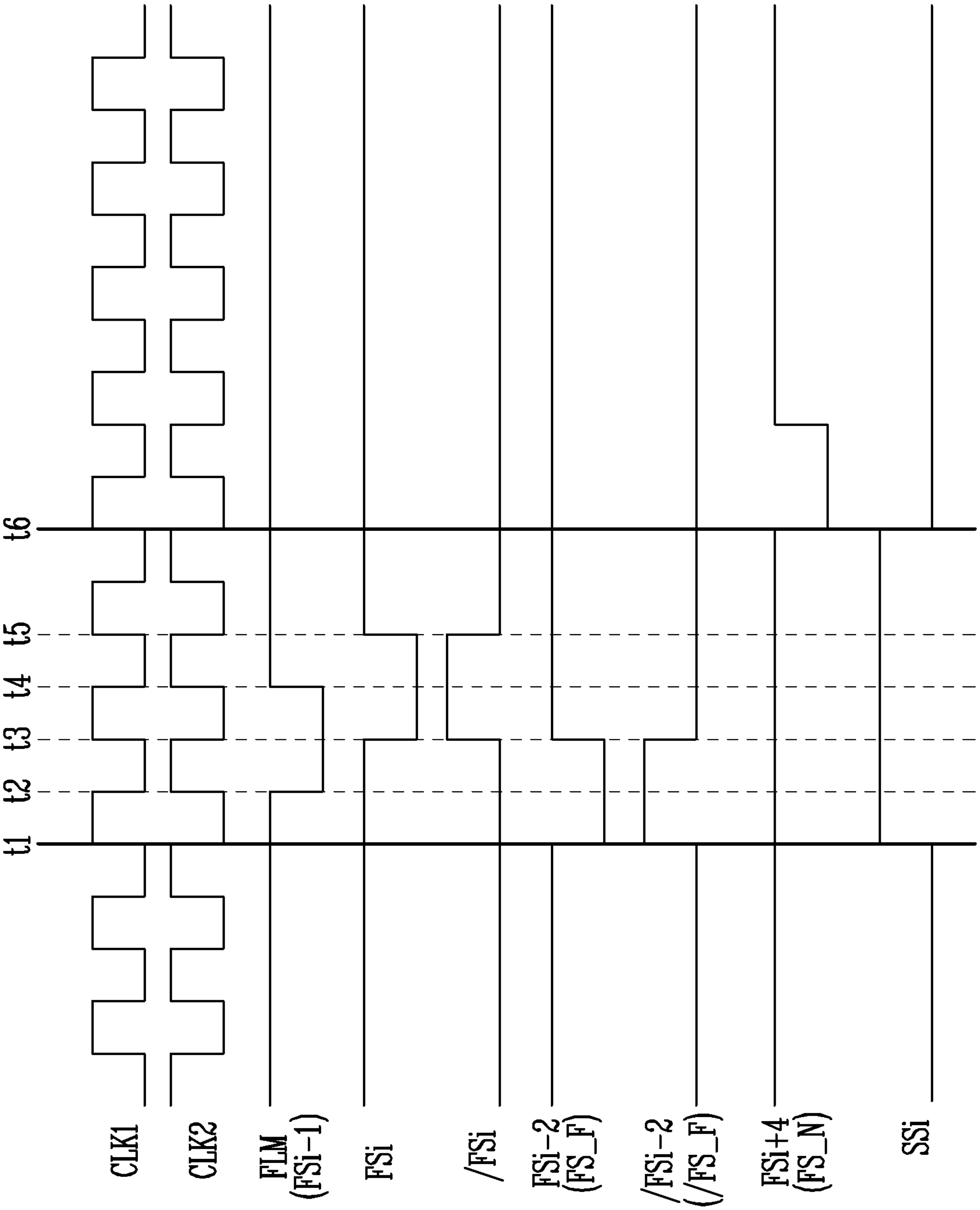
FIG. 2 is a schematic diagram illustrating an embodiment of a method of driving the stage circuit shown in FIG. 1.

As shown in FIG. 2, the first clock signal CLK1 may be a square wave signal repeating a high voltage and a low voltage. The high voltage of the first clock signal CLK1 may be set to a gate-off voltage of a P-type transistor and a gate-on voltage of an N-type transistor. The low voltage of the first clock signal CLK1 may be set to a gate-on voltage of a P-type transistor and a gate-off voltage of an N-type transistor.

As shown in FIG. 2, the second clock signal CLK2 may be a square wave signal repeating a high voltage and a low voltage. The high voltage of the second clock signal CLK2 may be set to a gate-off voltage of P-type transistor and a gate-on voltage of an N-type transistor. The low voltage of the second clock signal CLK2 may be set to a gate-on voltage of a P-type transistor and a gate-off voltage of an N-type transistor. The first clock signal CLK1 and the second clock signal CLK2 may have the same period and inverted phases.

The input portion 230 may control a voltage of a first node N1 electrically connected to the first output portion 240 in response to the clock signals CLK1 and CLK2 supplied to the second input terminal 212 and the third input terminal 213 respectively. The input portion 230 may include a first transistor M1 and a second transistor M2 electrically connected in parallel between the first input terminal 211 and the first node N1.

The first transistor M1 may be formed of an N-type transistor and may be electrically connected between the first input terminal 211 and the first node N1. Here, a meaning of being connected may include a meaning of being electrically connected. A gate electrode of the first transistor M1 may be electrically connected to the second input terminal 212. The first transistor M1 may control an electrical connection of the first input terminal 211 and the first node N1 while being turned on or off in response to the first clock signal CLK1 supplied to the second input terminal 212.

The second transistor M2 may be formed of a P-type transistor and may be electrically connected between the first input terminal 211 and the first node N1. A gate electrode of the second transistor M2 may be electrically connected to the third input terminal 213. The second transistor M2 may control an electrical connection of the first input terminal 211 and the first node N1 while being turned on or off in response to the second clock signal CLK2 supplied to the third input terminal 213.

The first transistor M1 and the second transistor M2 may be set as different types of transistors and may be electrically connected in parallel between the first input terminal 211 and the first node N1. The first transistor M1 and the second transistor M2 may be configured as transmission gates, and may transfer the start signal FLM supplied to the first input terminal 211 to the first node N1 in response to the clock signals CLK1 and CLK2.

A second input terminal included in a next stage circuit may receive the second clock signal CLK2, and a third input terminal may receive the first clock signal CLK1. Then, while successive stage circuits may be driven as a shift register, and may output a first signal FS while shifting the first signal FS every half period of the clock signals CLK1 and CLK2.

The first output portion 240 may be driven as an inverter and may control a voltage of the first output terminal 214 in response to a voltage of the first node N1. To this end, the first output portion 240 may include a third transistor M3 and a fourth transistor M4 electrically connected in series between the first power input terminal 231 and the second power input terminal 232. A gate electrode of the third transistor M3 and the fourth transistor M4 may be electrically connected to the first node N1.

The third transistor M3 may be formed of a P-type transistor and may be electrically connected between the first power input terminal 231 and the first output terminal 214. The third transistor M3 may control an electrical connection of the first power input terminal 231 and the first output terminal 214 in response to the voltage of the first node N1.

The fourth transistor M4 may be formed of an N-type transistor and may be electrically connected between the second power input terminal 232 and the first output terminal 214. The fourth transistor M4 may control an electrical connection of the second power input terminal 232 and the first output terminal 214 in response to the voltage of the first node N1.

The first output terminal 214 may output a voltage supplied from the first output portion 240 as an inverted first signal /FS.

The second output portion 250 may be driven as an inverter, and may invert the voltage of the first output terminal 214 and supply the inverted voltage to the second output terminal 215. The first signal FS may be output to the second output terminal 215. The inverted first signal /FS may have a voltage obtained by inverting the first signal FS. For example, in case that the first signal FS may be set to a high voltage (or a low voltage), the inverted first signal /FS may be set to a low voltage (or a high voltage).

The second output portion 250 may include a fifth transistor M5 and a sixth transistor M6 electrically connected in series between the first power input terminal 231 and the second power input terminal 232. A gate electrode of the fifth transistor M5 and the sixth transistor M6 may be electrically connected to the first output terminal 214.

The fifth transistor M5 may be formed of a P-type transistor and may be electrically connected between the first power input terminal 231 and the second output terminal 215. The fifth transistor M5 may control an electrical connection of the first power input terminal 231 and the second output terminal 215 in response to the voltage of the first output terminal 214.

The sixth transistor M6 may be formed of an N-type transistor and may be electrically connected between the second power input terminal 232 and the second output terminal 215. The sixth transistor M6 may control an electrical connection between the second power input terminal 232 and the second output terminal 215 in response to the voltage of the first output terminal 214.

The second output terminal 215 may output a voltage supplied from the second output portion 250 as the first signal FS.

The first capacitor C1 may be electrically connected between the first node N1 and the second power input terminal 232. The first capacitor C1 may store the voltage of the first node N1.

The generator 220 may output a second signal SS for driving a second type (for example, N-type) and/or first type (for example, P-type) transistor. To this end, the generator 220 may include a controller 260 and an output portion 270.

The controller 260 may be electrically connected to a first signal input terminal 221 and a second signal input terminal 222. The first signal input terminal 221 may receive a first signal FS_N (or a first input signal) of the next stage circuit.

A driver (scan driver, emission driver, scan/emission driver, or the like) may include multiple stage circuits 200, and the stage circuits 200 may sequentially output the first signal FS and the second signal SS while being driven as a shift register. Assuming that the stage circuit 200 may be positioned in an i-th (i is a natural number) pixel row (or horizontal line), the first signal FS_N (that is, the first input signal) of the next stage circuit may be a first signal output from any one of stage circuits positioned after the i-th pixel row.

The second signal input terminal 222 may receive an inverted first signal /FS_F (or a second input signal) of a previous stage circuit. Assuming that the stage circuit 200 may be positioned in the i-th pixel row (or horizontal line), the inverted first signal /FS_F (that is, the second input signal) of the previous stage circuit may be an inverted first signal output from any one of previously stage circuits positioned before the i-th pixel row.

The controller 260 may control a voltage of a first node N11 in response to the first input signal FS_N and the second input signal /FS_F supplied to the first signal input terminal 221 and the second signal input terminal 222 respectively. The controller 260 may include a first transistor M11 and a second transistor M12 electrically connected in series between the first power input terminal 231 and the second power input terminal 232.

The first transistor M11 may be formed of a P-type transistor and may be electrically connected between the first power input terminal 231 and the first node N11. A gate electrode of the first transistor M11 may be electrically connected to the first signal input terminal 221. The first transistor M11 may control an electrical connection of first power input terminal 231 and the first node N11 while being turned on or off in response to the first input signal supplied to the first signal input terminal 221.

The second transistor M12 may be formed of an N-type transistor and may be electrically connected between the first node N11 and the second power input terminal 232. A gate electrode of the second transistor M12 may be electrically connected to the second signal input terminal 222. The second transistor M12 may control an electrical connection of the second power input terminal 232 and the first node N11 while being turned on or off in response to the second input signal supplied to the second signal input terminal 222.

The output portion 270 may control a voltage of the output terminal 224 in response to a voltage of the first node N11. For example, the output portion 270 may output the second signal SS to the output terminal 224. To this end, the output portion 270 may include a third transistor M13 and a fourth transistor M14 electrically connected in series between the first power input terminal 231 and the second power input terminal 232.

The third transistor M13 may be formed of a P-type transistor and may be electrically connected between the first power input terminal 231 and the output terminal 224. A gate electrode of the third transistor M13 may be electrically connected to the third signal input terminal 223. The third transistor M13 may control an electrical connection of the first power input terminal 231 and the output terminal 224 while being turned on or off in response to the first signal FS_F (or the third input signal) of the previous stage supplied to the third signal input terminal 223.

Assuming that the stage circuit 200 is positioned in the i-th pixel row (or horizontal line), the first signal FS_F (that is, the third input signal) of the previous stage circuit may be a first signal output from any one of the stage circuits positioned before the i-th pixel row. The third input signal FS_F may correspond to a signal obtained by inverting the second input signal /FS_F. The second input signal /FS_F and the third input signal FS_F may be output signals of the same stage circuit.

The fourth transistor M14 may be formed of an N-type transistor and may be electrically connected between the output terminal 224 and the second power input terminal 232. A gate electrode of the fourth transistor M14 may be electrically connected to the first node N11. The fourth transistor M14 may control an electrical connection of the second power input terminal 232 and the output terminal 224 while being turned on or off in response to the voltage of the first node N11.

A second capacitor C2 may be electrically connected between the first node N11 and the second power input terminal 232. The second capacitor C2 may store the voltage of the first node N11.

Figure 3:
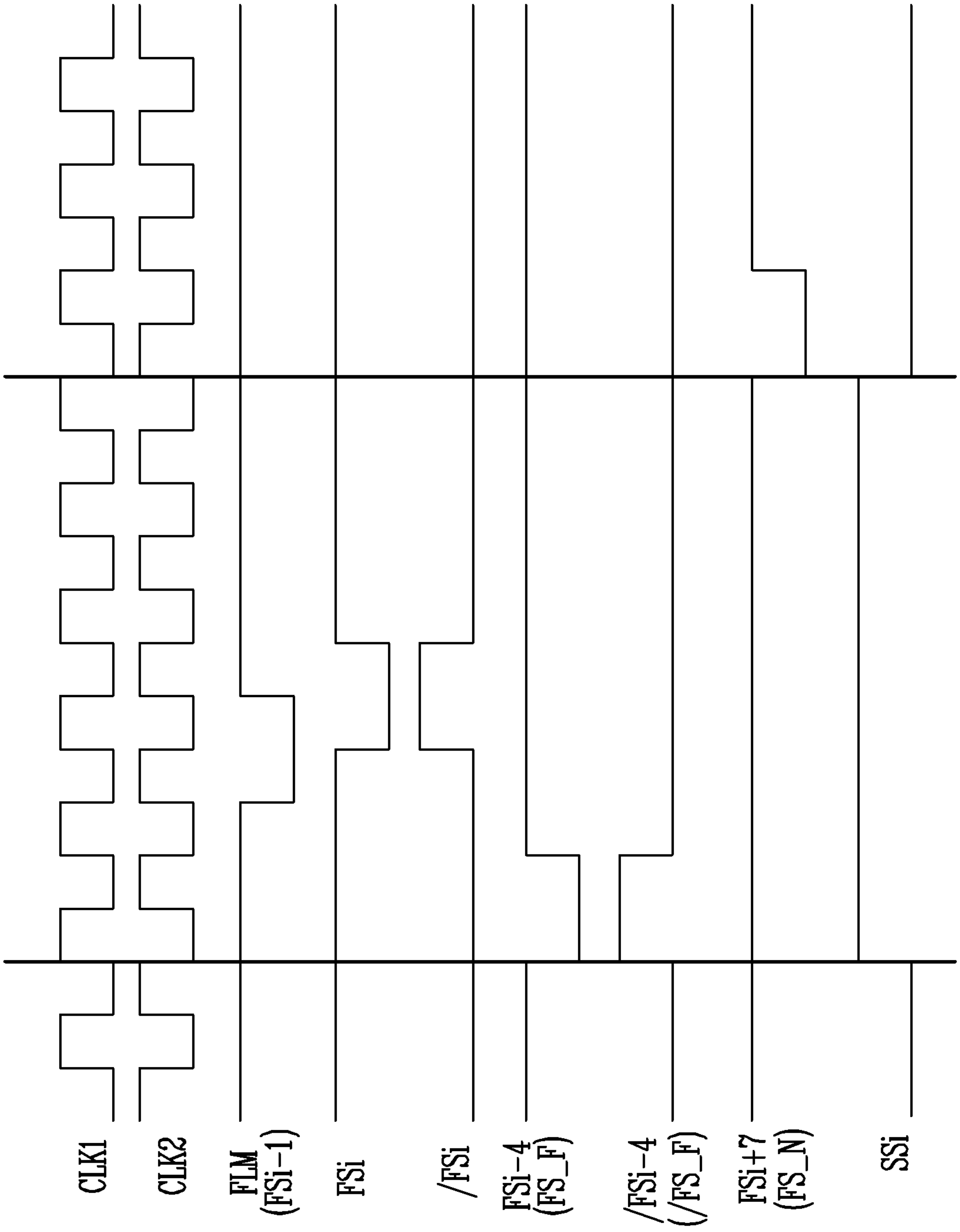
FIG. 3 is a schematic diagram illustrating an embodiment of a method of driving the stage circuit shown in FIG. 1.

FIG. 2 is a schematic diagram illustrating an embodiment of a method of driving the stage circuit shown in FIG. 1. FIG. 3 is a schematic diagram illustrating an embodiment of a method of driving the stage circuit shown in FIG. 1.

In FIG. 2, it may be assumed that the stage circuit 200 may be positioned on the i-th horizontal line. It may also be assumed that the first input signal FS_N may be a first signal of an (i+4)-th stage circuit FSi+4, the second input signal /FS_F may be an inverted first signal of an (i−2)-th stage circuit/FSi−2, and the third input signal FS_F may be a first signal of the (i-2)-th stage circuit FSi−2.

Referring to FIG. 2, the first clock signal CLK1 and the second clock signal CLK2 have the same period and inverted phases.

First, at a first time point t1, the high level (or the high voltage) of second input signal /FS_F may be input to the second signal input terminal 222, and the low level (or the low voltage) of third input signal FS_F may be input to the third signal input terminal 223.

In case that the high level of second input signal /FS_F is input to the second signal input terminal 222, the second transistor M12 may be turned on. In case that the second transistor M12 is turned on, the second power VGL may be supplied to the first node N11. In case that the second power VGL is supplied to the first node N11, the fourth transistor M14 may be turned off.

In case that the low level of third input signal FS_F is input to the third signal input terminal 223, the third transistor M13 may be turned on. In case that the third transistor M13 is turned on, the voltage of the first power VGH may be supplied to the output terminal 224. The voltage of the first power VGH supplied to the output terminal 224 may be a second signal SSi (or a high level of second signal) and may be supplied to a separate signal line (for example, a scan line or an emission control line).

At a second time point t2, the start signal FLM of a low level may be supplied to the first input terminal 211. Here, the start signal FLM may be a first signal FSi−1 of an (i−1)-th stage circuit. At the second time point t2, since the first clock signal CLK1 may be set to a low level and the second clock signal CLK2 may be set to a high level, the first transistor M1 and the second transistor M2 may maintain a turn-off state.

At a third time point t3, the low level of second input signal /FS_F may be input to the second signal input terminal 222, and the high level of third input signal FS_F may be input to the third signal input terminal 223.

In case that the low level of second input signal /FS_F is input to the second signal input terminal 222, the second transistor M12 may be turned off. At this time, the fourth transistor M14 maintains a turned-off state by a voltage charged in the second capacitor C2.

In case that the high level of third input signal FS_F is input to the third signal input terminal 223, the third transistor M13 may be turned off. At this time, the output terminal 224 may maintain a voltage of the high level of second signal SSi by a parasitic capacitor of the output terminal 224 and a separate signal line.

At the third time point t3, the high level of first clock signal CLK1 may be supplied to the second input terminal 212, and thus the first transistor M1 may be turned on. At the third time point t3, the low level of second clock signal CLK2 may be supplied to the third input terminal 213, and thus the second transistor M2 may be turned on.

In case that the first transistor M1 and the second transistor M2 are turned on, the low level of start signal FLM may be supplied to the first node N1. In case that the low level of start signal FLM is supplied to the first node N1, the third transistor M3 may be turned on and the fourth transistor M4 may be turned off.

In case that the third transistor M3 is turned on, the voltage of the first power VGH may be supplied to the first output terminal 214. The first power VGH supplied to the first output terminal 214 may be supplied to the next stage (for example, an (i+2)-th stage) as an inverted first signal /FSi.

In case that the voltage of the first power VGH is supplied to the first output terminal 214, the fifth transistor M5 may be turned off, and the sixth transistor M6 may be turned on. In case that the sixth transistor M6 is turned on, the voltage of the second power VGL may be supplied to the second output terminal 215. The voltage of the second power VGL supplied to the second output terminal 215 may be supplied to a separate signal line (for example, the scan line) as the first signal FSi (or the low level of first signal).

At a fourth time point t4, a high level of voltage (or the high level of start signal FLM) may be supplied to the first input terminal 211. At the fourth time point t4, since the first clock signal CLK1 may be set to a low level and the second clock signal CLK2 may be set to a high level, the first transistor M1 and the second transistor M2 maintain a turn-off state.

At a fifth time point t5, the first clock signal CLK1 may be set to a high level and the second clock signal CLK2 may be set to a low level. Accordingly, the first transistor M1 and the second transistor M2 may be turned on.

In case that the first transistor M1 and the second transistor M2 are turned on, a high level of voltage may be supplied to the first node N1. Accordingly, the third transistor M3 may be turned off, and the fourth transistor M4 may be turned on.

In case that the fourth transistor M4 is turned on, the voltage of the second power VGL may be supplied to the first output terminal 214. In case that the voltage of the second power VGL is supplied to the first output terminal 214, the supply of the inverted first signal /FSi may be stopped (or the low level of inverted first signal /FSi may be supplied).

In case that the voltage of the second power VGL is supplied to the first output terminal 214, the fifth transistor M5 may be turned on, and the sixth transistor M6 may be turned off. In case that the fifth transistor M5 is turned on, the voltage of the first power VGH may be supplied to the second output terminal 215. In case that the voltage of the first power VGH is supplied to the second output terminal 215, the supply of the first signal FSi may be stopped (or the high level of first signal FSi may be supplied).

At a sixth time point t6, the low level of first input signal FS_N may be input to the first signal input terminal 221. In case that the low level of first input signal FS_N is input to the first signal input terminal 221, the first transistor M11 may be turned on.

In case that the first transistor M11 is turned on, the voltage of the first power VGH may be supplied to the first node N11. In case that the voltage of the first power VGH is supplied to the first node N11, the fourth transistor M14 may be turned on. In case that the fourth transistor M14 is turned on, the voltage of the second power VGL may be supplied to the output terminal 224. In case that the voltage of the second power VGL is supplied to the output terminal 224, the output of the second signal SSi may be stopped (or the low level of second signal SSi may be supplied).

As described above, the stage circuit 200 according to an embodiment of the disclosure may supply the start signal FLM to the driver 210, and thus the driver 210 may output the low level of first signal FSi. The low level of first signal FSi output from the driver 210 may be supplied to a P-type transistor as the scan signal.

The stage circuit 200 according to an embodiment of the disclosure may supply the first input signal FS_N, the second input signal /FS_F, and the third input signal FS_F to the generator 220, and thus may output the high level of second signal SSi. The high level of second signal SSi output from the generator 220 may be supplied to a P-type transistor as the emission control signal. The high level of second signal SSi output from the generator 220 may be supplied to an N-type transistor as the scan signal.

In an embodiment of the disclosure, a supply period of the high level of second signal SSi may be controlled by controlling the first input signal FS_N, the second input signal /FS_F, and the third input signal FS_F. For example, in FIG. 2, the second signal SSi may maintain a high level of voltage during three periods of the first clock signal CLK1.

For example, as shown in FIG. 3, the first input signal FS_N may be a first signal of an (i+7)-th stage circuit FSi+7, the second input signal /FS_F may be an inverted first signal of an (i−4)-th stage circuit/FSi−4, and the third input signal FS_F may be a first signal of the (i−4)-th stage circuit FSi−4. The second signal SSi may maintain a high level of voltage during five or more periods of the first clock signal CLK1.

Figure 4:
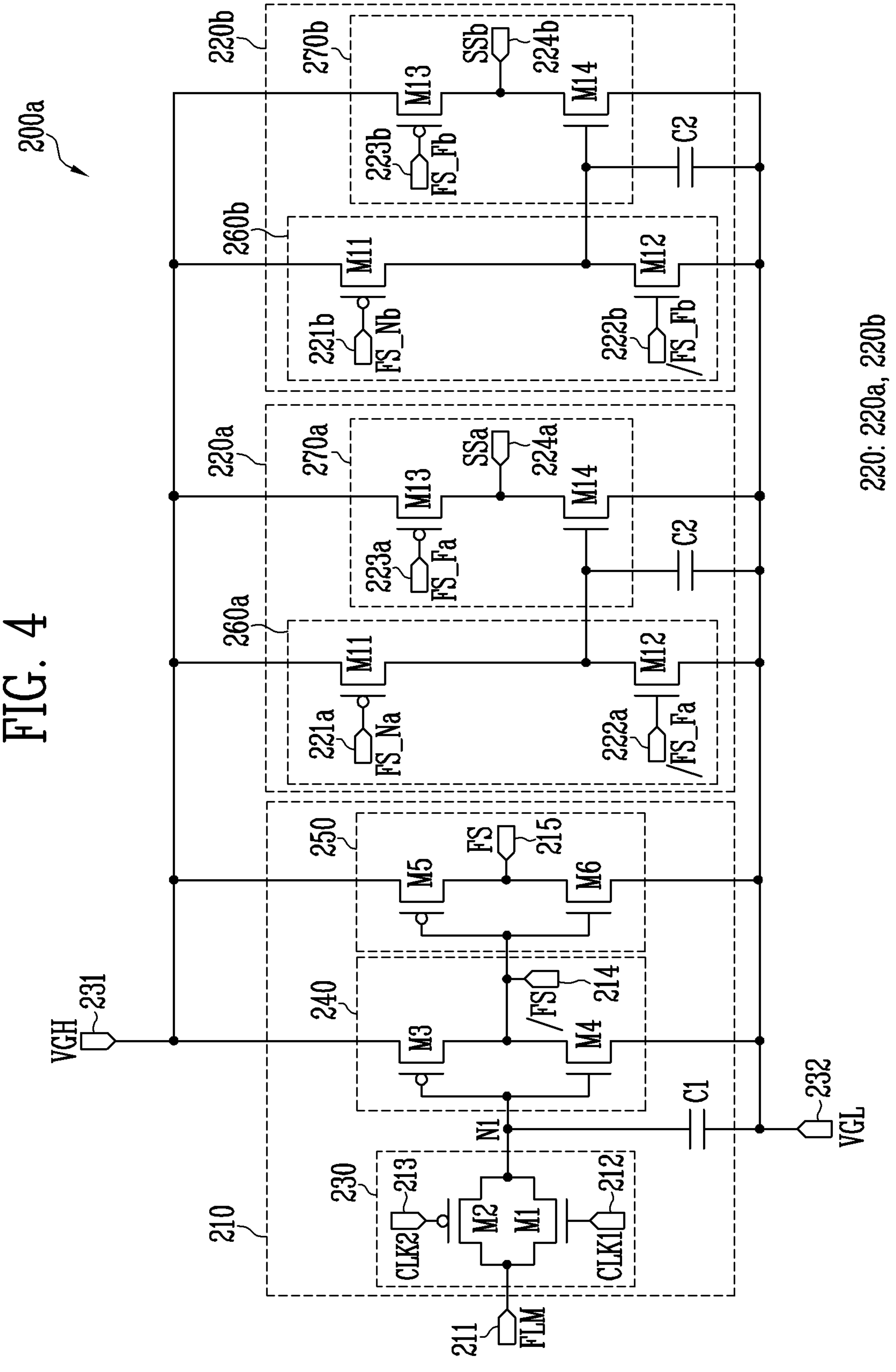
FIG. 4 is a schematic diagram illustrating a stage circuit according to an embodiment of the disclosure.

FIG. 4 is a schematic diagram illustrating a stage circuit according to an embodiment of the disclosure. In case that describing FIG. 4, a detailed description of the same configuration as that of FIG. 1 may be omitted.

Referring to FIG. 4, a stage circuit 200*a* according to an embodiment of the disclosure may include the driver 210 and the generator 220.

The driver 210 and the generator 220 may be electrically connected to the first power input terminal 231 and the second power input terminal 232.

The driver 210 may output the first signal FS and the inverted first signal /FS. To this end, the driver 210 may include the input portion 230, the first output portion 240, the second output portion 250, and the first capacitor C1. Since a configuration of the driver 210 has been described with reference to FIG. 1, overlapping descriptions may be omitted.

The generator 220 may output second signals SSa and SSb. To this end, the generator 220 may include a first generator 220*a* and a second generator 220*b*.

The first generator 220*a* may include a controller 260*a* and an output portion 270*a*. A configuration of the controller 260*a* and the output portion 270*a* may be the same as that of the controller 260 and the output portion 270 shown in FIG. 1, and an overlapping description may be omitted.

A first signal input terminal 221*a* of the first generator 220*a* may receive a first input signal FS_Na, a second signal input terminal 222*a* may receive a second input signal /FS_Fa, and a third signal input terminal 223*a* may receive a third input signal FS_Fa. The first generator 220*a* as described above may output a second signal SSa to an output terminal 224*a* in response to the first input signal FS_Na, the second input signal /FS_Fa, and the third input signal FS_Fa.

The second generator 220*b* may include a controller 260*b* and an output portion 270*b*. A configuration of the controller 260*b* and the output portion 270*b* may be the same as that of the controller 260 and the output portion 270 shown in FIG. 1, and an overlapping description may be omitted.

A first signal input terminal 221*b* (or a fourth signal input terminal) of the second generator 220*b* may receive a first input signal FS_Nb (or a fourth input signal), a second signal input terminal 222*b* (or a fifth signal input terminal) may receive a second input signal /FS_Fb (or a fifth input signal), and a third signal input terminal 223*b* (or a sixth signal input terminal) may receive a third input signal FS_Fb (or a sixth input signal). The second generator 220*b* described above may output a second signal SSb (or a third signal) in response to the first input signal FS_Nb, the second input signal /FS_Fb, and the third input signal FS_Fb.

Here, a width (or a length) of the high level of second signal SSa output from the first generator 220*a* may be different from a width of the high level of second signal SSb output from the second generator 220*b*.

For example, the first input signal FS_Na may be the first signal of the (i+4)-th stage circuit, the second input signal /FS_Fa may be the inverted first signal of the (i−2)-th stage circuit, and the third input signal FS_Fa may be the first signal of the (i−2)-th stage circuit. The high level of second signal SSa output from the generator 220*a* may maintain a high level of voltage during three periods of the first clock signal CLK1.

For example, the first input signal FS_Nb may be the first signal of the (i+7)-th stage circuit, the second input signal /FS_Fb may be the inverted first signal of the (i−4)-th stage circuit, and the third input signal FS_Fb may be the first signal of the (i−4)-th stage circuit. The high level of second signal SSb output from the second generator 220*b* may maintain a high level of voltage during five or more periods of the first clock signal CLK1.

In an embodiment of the disclosure, the stage circuits 200 and 200*a* may include multiple generators 220 as needed, and thus may generate the second signal SS having various widths.

The stage circuits 200 and 200*a* according to the above-described embodiment of the disclosure may generate a low level of signal and a high level of signal using one stage, and thus the mounting area of the stage circuits 200 and 200*a* may be minimized. Since the stage circuits 200 and 200*a* according to an embodiment of the disclosure use the two clock signals CLK1 and CLK2, the one start signal FLM, and the two power VGH and VGL, the mounting area of the stage circuits 200 and 200*a* may be minimized (that is, a dead space may be reduced).

In an embodiment of the disclosure, various signals may be generated using the two clock signals CLK1 and CLK2, and thus power consumption due to charging and discharging of the capacitors C1 and C2 may be minimized.

Figure 5:
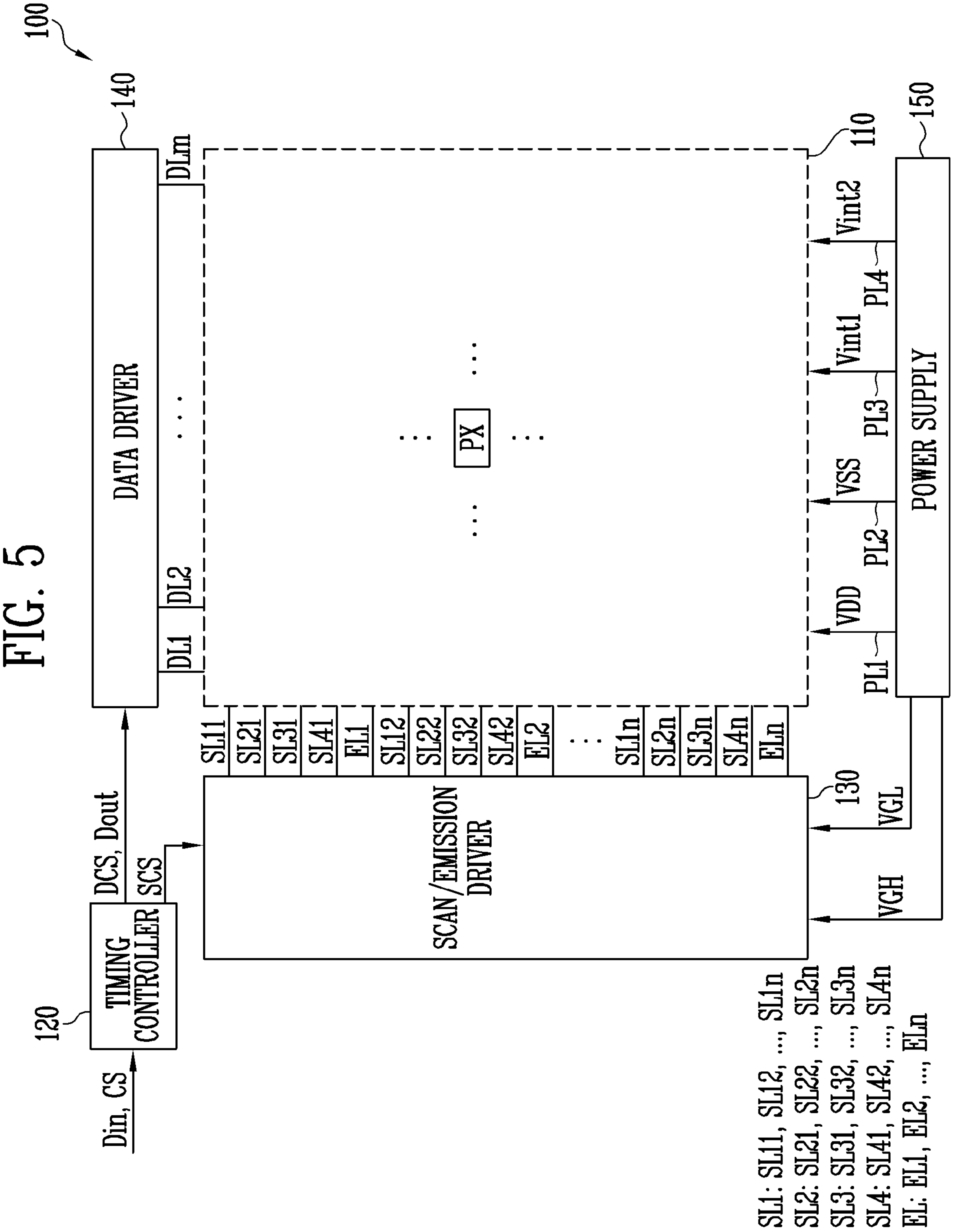
FIG. 5 is a schematic diagram illustrating a display device according to an embodiment of the disclosure.

FIG. 5 is a schematic diagram illustrating a display device according to an embodiment of the disclosure.

Referring to FIG. 5, the display device 100 according to an embodiment of the disclosure may include a pixel portion 110 (or a panel), a timing controller 120, a scan/emission driver 130, a data driver 140, and a power supply 150. The above-described configurations may be implemented as separate integrated circuits, and two or more of the above-described configurations may be integrated into one integrated circuit and implemented. The scan/emission driver 130 may be formed in the pixel portion 110.

The pixel portion 110 may include pixels PX electrically connected to first scan lines SL11, SL12, . . . , and SL1*n*, second scan lines SL21, SL22, . . . , and SL2*n*, third scan lines SL31, SL32, . . . , and SL3*n*, fourth scan lines SL41, SL42, . . . , and SL4*n*, data lines DL1, DL2, . . . , and DLm, emission control lines EL1, EL2, . . . , and ELn, and power lines PL1, PL2, PL3, and PL4 (where n and m may be natural numbers).

For example, a pixel PXij (refer to FIG. 6) positioned on the i-th horizontal line (or pixel row) and a j-th vertical line (or pixel column) may be electrically connected to an i-th first scan line SL1*i*, an i-th second scan line SL2*i*, an i-th third scan line SL3*i*, an i-th fourth scan line SL4*i*, an i-th emission control line ELi, and a j-th data line DLj.

In case that a first scan signal is supplied to the first scan lines SL11 to SL1*n*, the pixels PX may be selected in a horizontal line portion (for example, the pixels PX electrically connected to the same scan line may be divided as one horizontal line (or pixel row), and the pixels PX selected by the first scan signal may be supplied with a data signal from a data line (any one of the data lines DL1 to DLm) electrically connected thereto. The pixels PX receiving the data signal may generate light of a luminance (e.g., predetermined or selectable luminance) in response to a voltage of the data signal.

The scan/emission driver 130 may receive a first driving control signal SCS from the timing controller 120. The first driving control signal SCS may include the start signal FLM and the clock signals CLK1 and CLK2 required for driving the scan/emission driver 130.

The scan/emission driver 130 may sequentially generate the first signal FS while shifting the start signal FLM using the clock signals CLK1 and CLK2. Here, the first signal FS may be a first scan signal. The scan/emission driver 130 may generate at least one or more second signals SS using the first signal FS. Here, the second signal SS may be a second scan signal and/or an emission control signal. The scan/emission driver 130 includes multiple stage circuits, and a detailed description thereof may be described later.

The scan signal may be set to a gate-on voltage so that a transistor included in the pixels PX may be turned on. For example, a scan signal supplied to a P-type transistor may be set to a low level. For example, a scan signal supplied to an N-type transistor may be set to a high level. Thereafter, supplying the scan signal may mean that a gate-on voltage may be supplied to the scan lines SL1, SL2, SL3, and SL4. Not supplying the scan signal may mean that a gate-off voltage may be supplied to the scan lines SL1, SL2, SL3, and SL4.

The emission control signal may be set to a gate-off voltage so that a transistor included in the pixels PX may be turned off. For example, an emission control signal supplied to a P-type transistor may be set to a high level. For example, an emission control signal supplied to an N-type transistor may be set to a low level. Thereafter, supplying the emission control signal may mean that a gate-off voltage may be supplied to an emission control line EL. Not supplying the emission control signal may mean that a gate-on voltage may be supplied to the emission control line EL.

The data driver 140 may receive output data Dout and a second driving control signal DCS from the timing controller 120. The second driving control signal DCS may include a sampling signal and/or timing signals required for driving the data driver 140. The data driver 140 may generate a data signal based on the second driving control signal DCS and the output data Dout. For example, the data driver 140 may generate an analog data signal based on a grayscale of the output data Dout. The data driver 140 may supply the data signal in one horizontal period portion.

The timing controller 120 may receive input data Din and a control signal CS from a host system through an interface. For example, the timing controller 120 may receive the input data Din and the control signal CS from at least one of a graphics processing unit (GPU), a central processing unit (CPU), and an application processor (AP) included in the host system. The control signal CS may include various signals including a clock signal.

The timing controller 120 may generate the first driving control signal SCS and the second driving control signal DCS based on the control signal CS. The first driving control signal SCS and the second driving control signal DCS may be supplied to the scan/emission driver 130 and the data driver 140, respectively.

The timing controller 120 may rearrange the input data Din according to a specification of the display device 100. The timing controller 120 may correct the input data Din to generate the output data Dout, and supply the output data Dout to the data driver 140. In an embodiment, the timing controller 120 may correct the input data Din in response to an optical measurement result measured during a process.

The power supply 150 may generate various power required for driving the display device 100. For example, the power supply 150 may generate the first driving power VDD, the second driving power VSS, first initialization power Vint1, second initialization power Vint2, first power VGH, and power VGL for the scan/emission driver 130. However, the present invention is not limited to this. The first power VGH and the second power VGL may also be supplied from other components (for example, the data driver 140).

The first driving power VDD may be power supplying a driving current to the pixels PX. The second driving power VSS may be power receiving the driving current from the pixels PX. During a period in which the pixels PX may be set to an emission state, the first driving power VDD may be set to a voltage higher than that of the second driving power VSS.

The first initialization power Vint1 is power that initializes a gate electrode of a driving transistor included in each of the pixels PX. The second initialization power Vint2 may be power that initializes a first electrode (or an anode electrode) of a light emitting element LD (refer to FIG. 6) included in each of the pixels PX. The first initialization power Vint1 may be set to a voltage equal to or different from that of the second initialization power Vint2. The first initialization power Vint1 may be set to a voltage lower than that of the data signal.

The first driving power VDD generated by the power supply 150 may be supplied to a first power line PL1, the second driving power VSS may be supplied to a second power line PL2, the first initialization power Vint1 may be supplied to a third power line PL3, and the second initialization power Vint2 may be supplied to the fourth power line PL4. The first power line PL1, the second power line PL2, the third power line PL3, and the fourth power line PL4 may be commonly electrically connected to the pixels PX, but an embodiment of the disclosure may not be limited thereto.

In an embodiment, the first power line PL1 may be configured of multiple power lines, and the power lines may be electrically connected to different pixels PX. In an embodiment, the second power line PL2 may be configured of multiple power lines, and the power lines may be electrically connected to different pixels PX. In an embodiment, the third power line PL3 may be configured of multiple power lines, and the power lines may be electrically connected to different pixels PX. In an embodiment, the fourth power line PL4 may be configured of multiple power lines, and the power lines may be electrically connected to different pixels PX. In an embodiment of the disclosure, the pixels PX may be electrically connected to any one of the first power line PL1, any one of the second power line PL2, any one of the third power line PL3, and any one of the fourth power line PL4.

Figure 6:
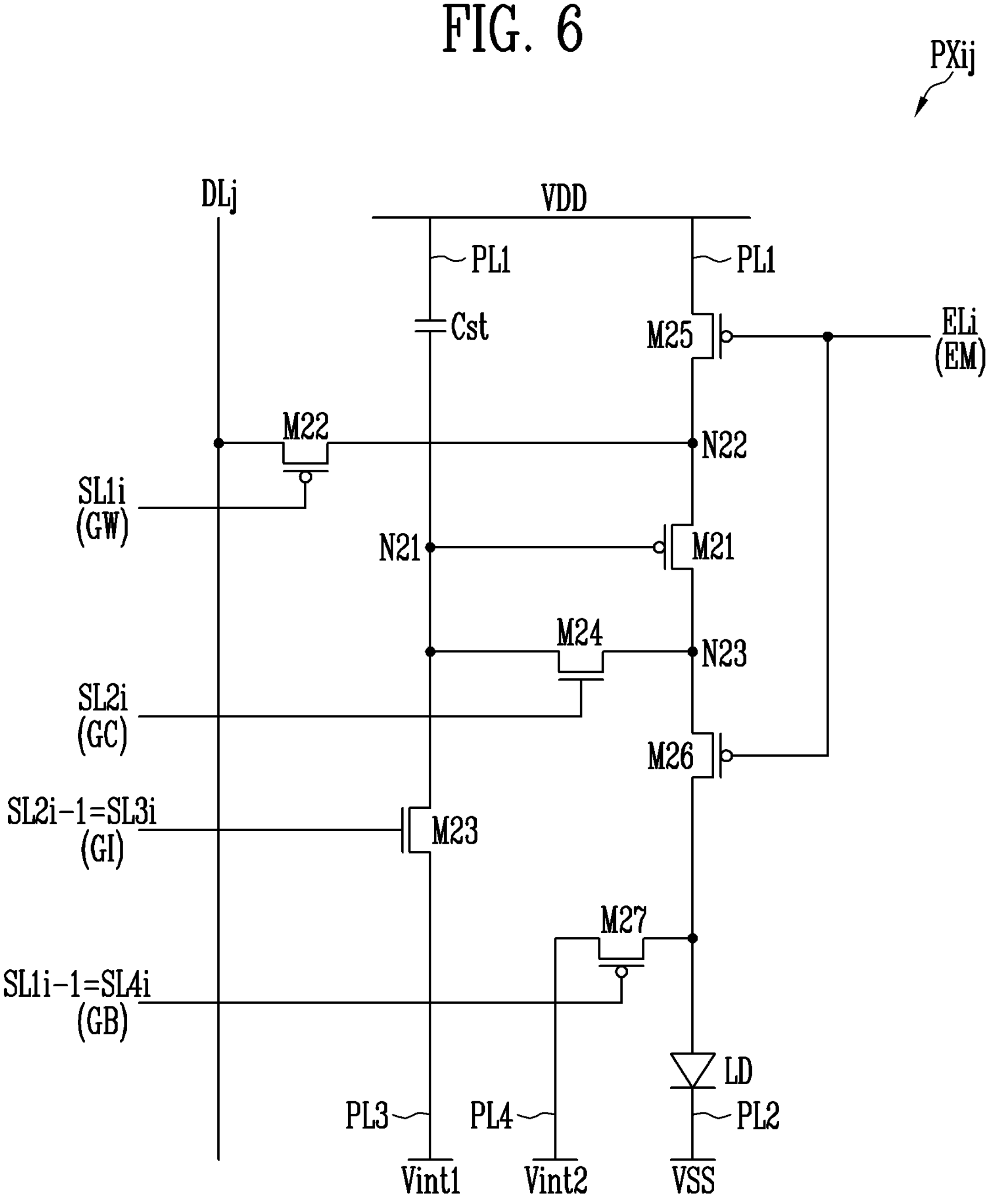
FIG. 6 is a schematic diagram illustrating an embodiment of a pixel shown in FIG. 5.

FIG. 6 is a schematic diagram illustrating an embodiment of the pixel shown in FIG. 5. FIG. 6 shows a pixel positioned on an i-th horizontal line and a j-th vertical line.

Referring to FIG. 6, the pixel PXij according to an embodiment of the disclosure may be electrically connected to corresponding signal lines SL1*i*, SL2*i*, SL3*i*, SL4*i*, ELi, and DLj. For example, the pixel PXij may be electrically connected to an i-th first scan line SL1*i*, an i-th second scan line SL2*i*, an i-th third scan line SL3*i*, an i-th fourth scan line SL4*i*, an i-th emission control line ELi, and a j-th data line DLj. In an embodiment, the pixel PXij may be further electrically connected to the first power line PL1, the second power line PL2, the third power line PL3, and the fourth power line PL4.

The i-th third scan line SL3*i* may be an (i−1)-th second scan line SL2*i*−1. The i-th fourth scan line SL4*i* may be an (i−1)-th first scan line SL1*i*−1. In this case, a signal required for driving the actual pixel PXij may be set to a first scan signal GW, a second scan signal GC, and an emission control signal EM. The i-th third scan line SL3*i* may be driven by a second scan signal of a previous pixel row, and the i-th fourth scan line SL4*i* may be driven by a first scan signal of the previous pixel row.

The pixel PXij according to an embodiment of the disclosure may include the light emitting element LD and a pixel circuit for controlling a current amount supplied to the light emitting element LD.

The light emitting element LD may be electrically connected between the first power line PL1 and the second power line PL2. For example, the first electrode (or the anode electrode) of the light emitting element LD may be electrically connected to the first power line PL1 via a sixth transistor M26, a third node N23, a first transistor M21, a second node N22, and a fifth transistor M25, and the second electrode (or the cathode electrode) of the light emitting element LD may be electrically connected to the second power line PL2. The light emitting element LD may generate light of a luminance (e.g., predetermined or selectable luminance) in response to the current amount supplied from the first power line PL1 to the second power line PL2 via the pixel circuit.

The light emitting element LD may be selected as an organic light emitting diode. The light emitting element LD may be selected as an inorganic light emitting diode (LED) such as a micro LED or a quantum dot LED. The light emitting element LD may be an element configured of a combination of an organic material and an inorganic material. Although FIG. 6 shows that the pixel PXij includes a single light emitting element LD, in an embodiment, the pixel PXij may include multiple light emitting elements LD and the light emitting elements LD may be electrically connected in series, parallel, or series-parallel to each other.

The pixel circuit may include the first transistor M21, a second transistor M22, a third transistor M23, a fourth transistor M24, the fifth transistor M25, the sixth transistor M26, a seventh transistor M27, and a storage capacitor Cst.

A first electrode of the first transistor M21 (or a driving transistor) may be electrically connected to the second node N22, and a second electrode may be electrically connected to the third node N23. A gate electrode of the first transistor M21 may be electrically connected to a first node N21. The first transistor M21 may control the current amount supplied from the first driving power VDD to the second driving power VSS via the light emitting element LD in response to a voltage of the first node N21.

The second transistor M22 may be electrically connected between the data line DLj and the second node N22. A gate electrode of the second transistor M22 may be electrically connected to the first scan line SL1*i*. The second transistor M22 may be turned on in case that the first scan signal GW may be supplied to the first scan line SL1*i* to electrically connect the data line DLj and the second node N22.

A first electrode of the third transistor M23 may be electrically connected to the first node N21, and a second electrode may be electrically connected to the third power line PL3. A gate electrode of the third transistor M23 may be electrically connected to the third scan line SL3*i*. The third transistor M23 may be turned on in case that a third scan signal GI may be supplied to the third scan line SL3*i* to supply a voltage of the first initialization power Vint1 to the first node N21. The first initialization power Vint1 may be set to a voltage lower than that of the data signal supplied to the data line DLj.

The fourth transistor M24 may be electrically connected between the first node N21 and the third node N23. A gate electrode of the fourth transistor M24 may be electrically connected to the second scan line SL2*i*. The fourth transistor M24 may be turned on in case that the second scan signal GC may be supplied to the second scan line SL2*i* to electrically connect the first node N21 and the third node N23. In case that the fourth transistor M24 may be turned on, the first transistor M21 may be electrically connected as a diode.

A first electrode of the fifth transistor M25 may be electrically connected to the first power line PL1, and a second electrode may be electrically connected to the second node N22. A gate electrode of the fifth transistor M25 may be electrically connected to the emission control line ELi. The fifth transistor M25 may be turned off in case that the emission control signal EM may be supplied to the emission control line ELi, and turned on in case that the emission control signal EM may not be supplied.

The sixth transistor M26 may be electrically connected between the third node N23 and the first electrode of the light emitting element LD. A gate electrode of the sixth transistor M26 may be electrically connected to the emission control line ELi. The sixth transistor M26 may be turned off in case that the emission control signal EM may be supplied to the emission control line ELi, and turned on in case that the emission control signal EM may not be supplied.

A first electrode of the seventh transistor M27 may be electrically connected to the first electrode of the light emitting element LD, and a second electrode may be electrically connected to the fourth power line PL4. A gate electrode of the seventh transistor M27 may be electrically connected to the fourth scan line SL4*i*. The seventh transistor M27 may be turned on in case that a fourth scan signal GB may be supplied to the fourth scan line SL4*i* to supply a voltage of the second initialization power Vint2 to the first electrode of the light emitting element LD.

In case that the voltage of the second initialization power Vint2 is supplied to the first electrode of the light emitting element LD, a parasitic capacitor of the light emitting element LD may be discharged. As a residual voltage charged in the parasitic capacitor of the light emitting element LD may be discharged (or removed), unintended fine light emission may be prevented. Accordingly, black expression capability of the pixel PXij may be improved.

The storage capacitor Cst may be electrically connected between the first power line PL1 and the first node N21. The storage capacitor Cst may store the voltage applied to the first node N21.

In an embodiment, the first transistor M21, the second transistor M22, the fifth transistor M25, the sixth transistor M26, and the seventh transistor M27 may be formed of a polysilicon semiconductor transistor. For example, the first transistor M21, the second transistor M22, the fifth transistor M25, the sixth transistor M26, and the seventh transistor M27 may include a polysilicon semiconductor layer formed through a low temperature poly-silicon (LTPS) process as an active layer (channel). The first transistor M21, the second transistor M22, the fifth transistor M25, the sixth transistor M26, and the seventh transistor M27 may be P-type transistors (for example, PMOS transistors). Accordingly, a gate-on voltage for turning on the first transistor M21, the second transistor M22, the fifth transistor M25, the sixth transistor M26, and the seventh transistor M27 may be a logic low level. Since the polysilicon semiconductor transistor has an advantage of fast response speed, the polysilicon semiconductor transistor may be applied to a switching element requiring fast switching.

In an embodiment, the third transistor M23 and the fourth transistor M24 may be formed of an oxide semiconductor transistor. For example, the third transistor M23 and the fourth transistor M24 may be N-type oxide semiconductor transistors (for example, NMOS transistors) and may include an oxide semiconductor layer as an active layer. Accordingly, a gate-on voltage for turning on the third transistor M23 and the fourth transistor M24 may be a logic high level.

The oxide semiconductor transistor may be processed at a low temperature and has charge mobility lower than that of the polysilicon semiconductor transistor. The oxide semiconductor transistor has an excellent off current characteristic. Therefore, in case that the third transistor M23 and the fourth transistor M24 may be formed of the oxide semiconductor transistors, a leakage current due to low-frequency driving may be minimized, and thus display quality may be improved.

Figure 7:
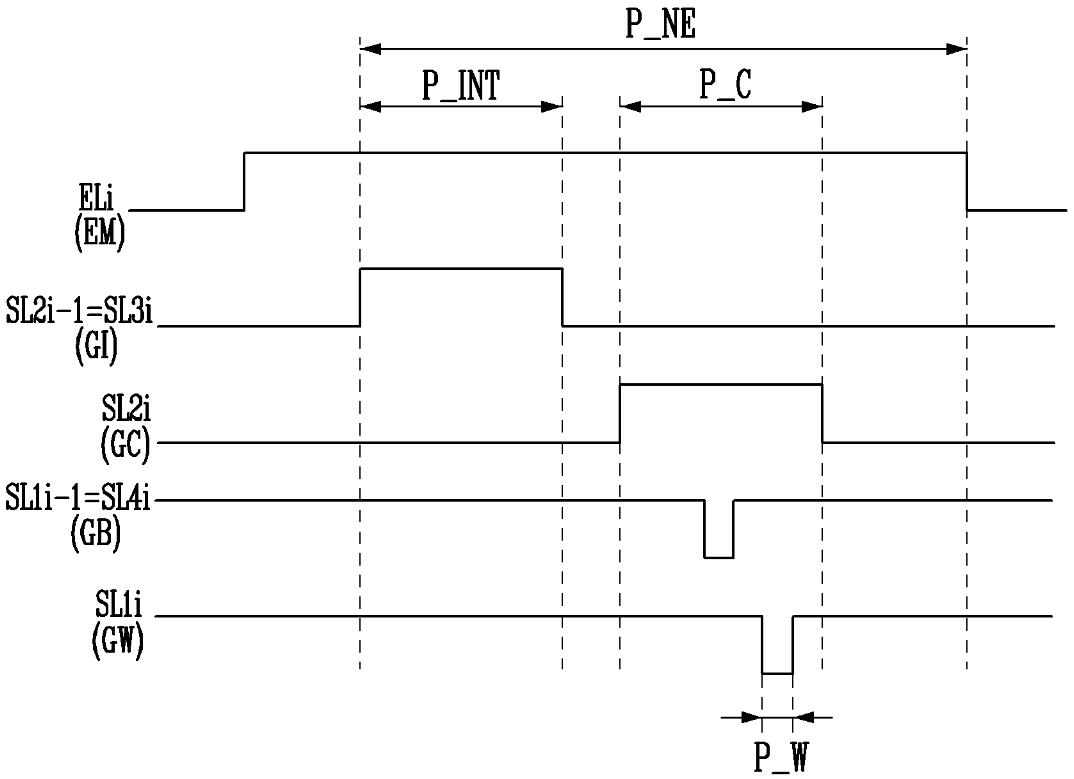
FIG. 7 is a schematic waveform diagram illustrating an embodiment of a method of driving the pixel shown in FIG. 6.

FIG. 7 is a schematic waveform diagram illustrating an embodiment of a method of driving the pixel shown in FIG. 6. In FIG. 7, it may be assumed that the i-th third scan line SL3*i* may be the (i−1)-th second scan line SL2*i*-1, and the i-th fourth scan line SL4*i* may be the (i−1)-th first scan line SL1*i*−1.

Referring to FIG. 7, one frame period may include a non-emission period P_NE, and the non-emission period P_NE may include an initialization period P_INT, a compensation period P_C, and a writing period P_W. The writing period P_W may be included in the compensation period P_C.

In the non-emission period P_NE, the emission control signal EM may have a high level. The fifth transistor M25 and the sixth transistor M26 may be turned off in response to the high level of emission control signal EM, and the pixel PXij may not emit light.

In the initialization period P_INT, the third scan signal GI may have a high level. The third transistor M23 may be turned on in response to the high level of third scan signal GI, and the voltage of the first initialization power Vint1 of the third power line PL3 may be provided to the first node N21.

Thereafter, during the compensation period P_C, the second scan signal GC may have a high level. The fourth transistor M24 may be turned on in response to the high level of second scan signal GC, and the first transistor M21 may be electrically connected as a diode.

In the writing period P_W, the first scan signal GW may have a low level. The second transistor M22 may be turned on in response to the low level of first scan signal GW, and the data signal may be provided to the second node N22 from the j-th data line DLj. Since the fourth transistor M24 may be turned on in response to the high level of second scan signal GC, the data signal may be transferred from the second node N22 to the first node N21 via the first transistor M21 and the fourth transistor M24. Since the first transistor M21 maintains a diode-connected form by the turned-on fourth transistor M24, the first node N21 may have a voltage in which a threshold voltage of the first transistor M21 may be compensated for in the data signal.

Before the writing period P_W, the fourth scan signal GB may have a low level. The seventh transistor M27 may be turned on in response to the low level of fourth scan signal GB, and the voltage of the second initialization power Vint2 may be supplied to the first electrode of the light emitting element LD.

Thereafter, the non-emission period P_NE may be ended, and the emission control signal EM may have a low level. The fifth transistor M25 and the sixth transistor M26 may be turned on in response to the low level of emission control signal EM. In case that the fifth transistor M25 and the sixth transistor M26 may be turned on, a current movement path may be formed to the second power line PL2 through the first power line PL1, the fifth transistor M25, the first transistor M21, the sixth transistor M26 and the light emitting element LD. At this time, according to an operation of the first transistor M21, a driving current corresponding to the voltage of the first node N21 may flow through the light emitting element LD, and the light emitting element LD may emit light with a luminance corresponding to the driving current.

Figure 8:
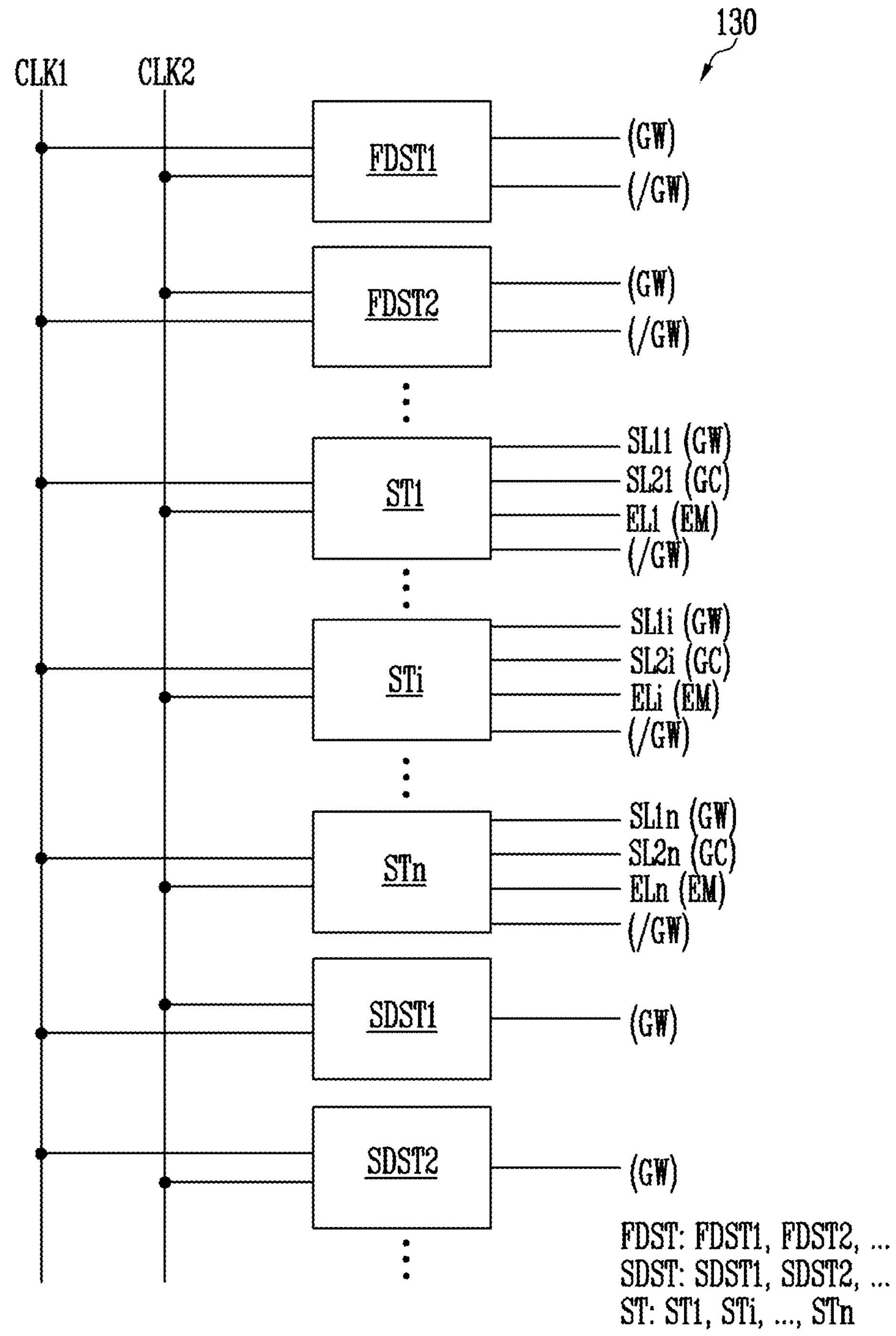
FIG. 8 is a schematic diagram illustrating an embodiment of a scan/emission driver shown in FIG. 5.

FIG. 8 is a schematic diagram illustrating an embodiment of the scan/emission driver shown in FIG. 5.

Referring to FIG. 8, the scan/emission driver 130 according to an embodiment of the disclosure includes multiple first dummy stage circuits FDST1, FDST2, . . . , stage circuits ST1, . . . , STi, STi+1, . . . , and STn, and second dummy stage circuits SDST1, SDST2, . . . .

Each of the first dummy stage circuits FDST, the stage circuits ST, and the second dummy stage circuits SDST may have the same structure as the stage circuit 200*a* shown in FIG. 4. For example, each of the first dummy stage circuits FDST, the stage circuits ST, and the second dummy stage circuits SDST may include the driver 210, the first generator 220*a*, and the second generator 220*b*.

The first dummy stage circuits FDST may sequentially generate the first scan signal GW (that is, the first signal FS) and an inverted first scan signal /GW (that is, the inverted first signal /FS) while alternately receiving the first clock signal CLK1 and the second clock signal CLK2.

The inverted first scan signal /GW generated in the first dummy stage circuits FDST may be used as second input signals /FS_Fa and /FS_Fb of the first generator 220*a* and the second generator 220*b* included in any one of the stage circuits ST. The first scan signal GW generated in the first dummy stage circuits FDST may be used as third input signals FS_Fa and FS_Fb of the first generator 220*a* and the second generator 220*b* included in any one of the stage circuits ST.

The number of first dummy stage circuits FDST may be determined in correspondence with a width of the high level of emission control signal EM and/or the high level of second scan signal GC. For example, as the width of the high level of emission control signal EM increases, the number of first dummy stage circuits FDST may increase.

The second dummy stage circuits SDST may sequentially generate the first scan signal GW (that is, the first signal FS) while alternately receiving the first clock signal CLK1 and the second clock signal CLK2.

The first scan signal GW generated in the second dummy stage circuits SDST may be used as first input signals FS_Na and FS_Nb of the first generator 220*a* and the second generator 220*b* included in any one of the stage circuits ST.

The number of second dummy stage circuits SDST may be determined in correspondence with the width of the high level of emission control signal EM and/or the high level of second scan signal GC. For example, as the width of the high level of emission control signal EM increases, the number of second dummy stage circuits SDST may increase.

The stage circuits ST may generate the first scan signal GW (that is, the first signal FS), the second scan signal GC (that is, the second signal SSa), and the emission control signal EM (that is, the second signal SSb) while alternately receiving the first clock signal CLK1 and the second clock signal CLK2.

Each of the stage circuits ST may generate the first scan signal GW using the driver 210 shown in FIG. 4, generate the second scan signal GC using the first generator 220*a*, and generate the emission control signal EM using the second generator 220*b*. An operation process of each of the stage circuits ST may be the same as that of FIG. 4.

Figure 9:
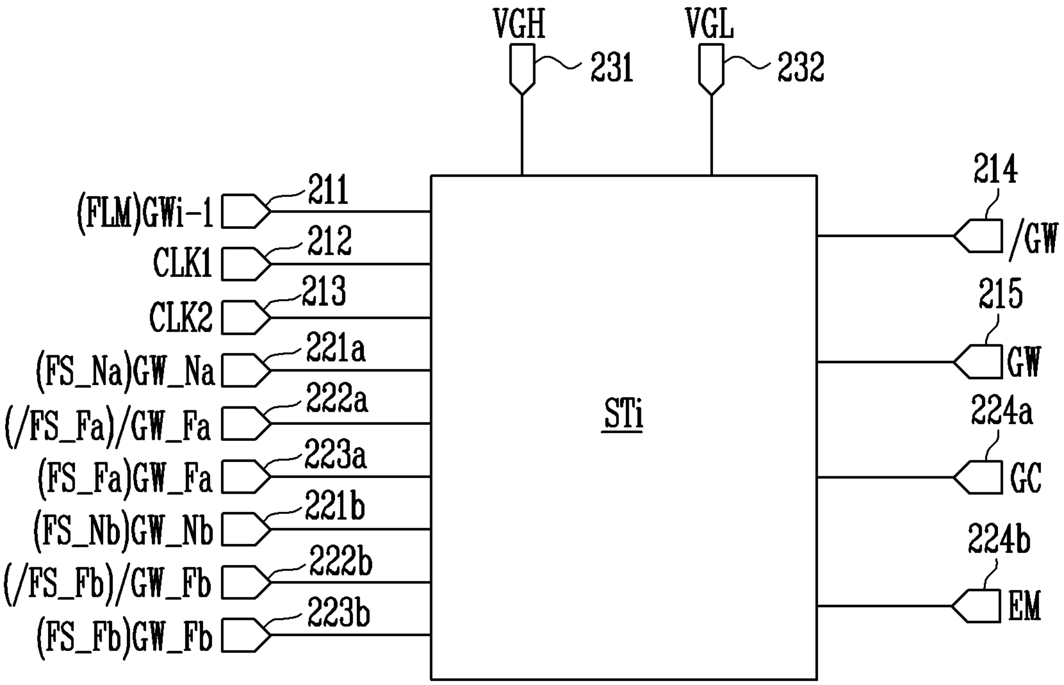
FIG. 9 is a schematic diagram illustrating terminals electrically connected to a stage circuit shown in FIG. 8.
Figure 10:
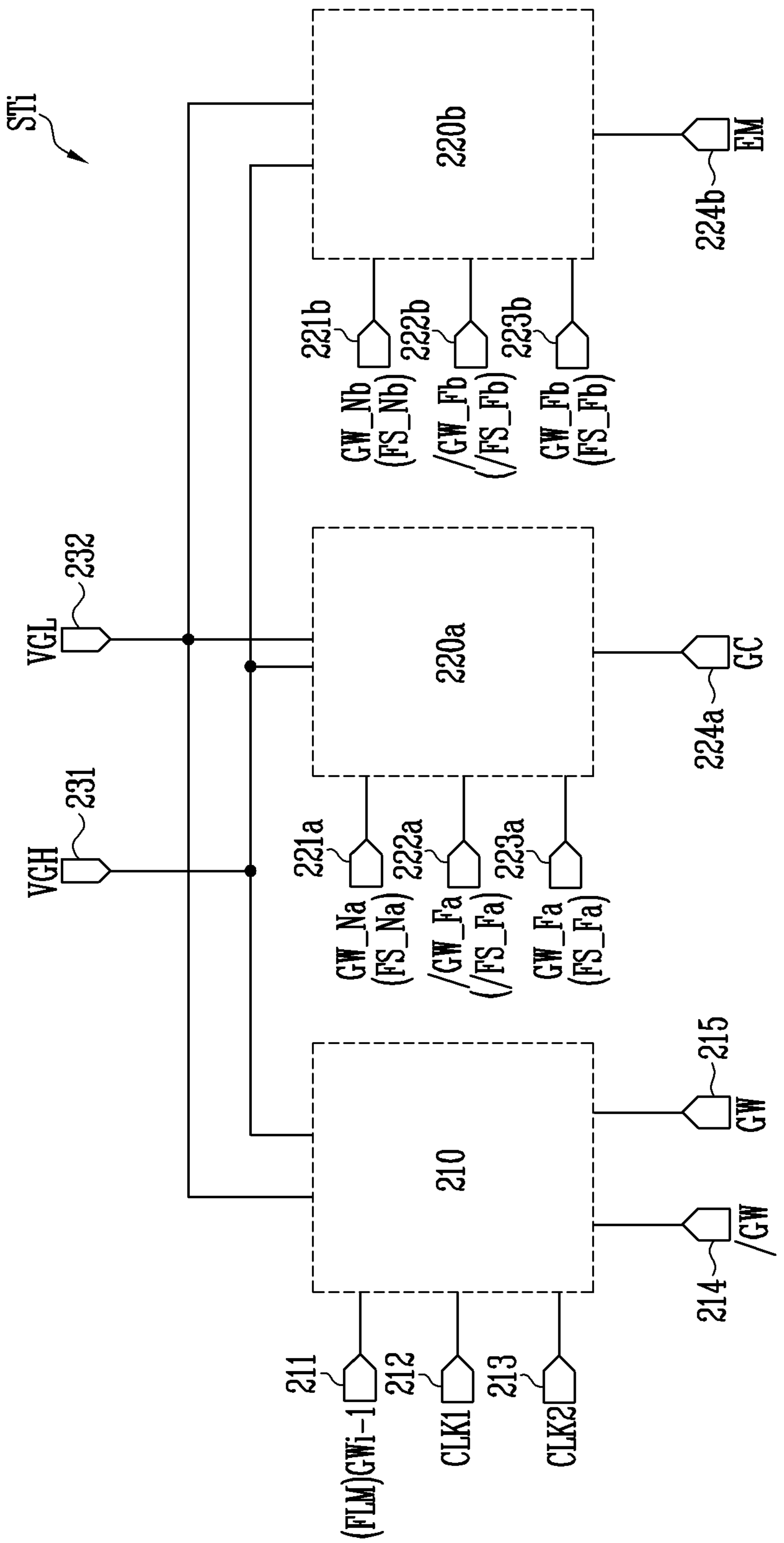
FIG. 10 is a functionally separated schematic diagram of the stage circuit of FIG. 9.

FIG. 9 is a schematic diagram illustrating terminals electrically connected to the stage circuit shown in FIG. 8. FIG. 10 is a functionally separated schematic diagram of the stage circuit of FIG. 9. FIGS. 9 and 10 show the i-th stage circuit STi.

Referring to FIGS. 1, 4, 9, and 10, the stage circuit STi includes the driver 210, the first generator 220*a*, and the second generator 220*b*. As described above, a configuration of the driver 210, the first generator 220*a*, and the second generator 220*b* may be the same as that of the stage circuit 200*a* shown in FIG. 4.

The stage circuit STi may be electrically connected to a first input terminal 211, a second input terminal 212, a third input terminal 213, a first signal input terminal 221*a*, a second signal input terminal 222*a*, a third input terminal 223*a*, a first signal input terminal 221*b*, a second signal input terminal 222*b*, a third signal input terminal 223*b*, a first output terminal 214, a second output terminal 215, an output terminal 224*a*, an output terminal 224*b*, a first power input terminal 231, and a second power input terminal 232.

The first input terminal 211 receives the start signal FLM (or a scan signal GWi−1 of the previous stage circuit), the second input terminal 212 receives the first clock signal CLK1, and the third input terminal 213 receives the second clock signal CLK2. The driver 210 may output the inverted scan signal /GW to the first output terminal 214 and output the scan signal GW to the second output terminal 215, by using the start signal FLM or GWi−1, the first clock signal CLK1, and the second clock signal CLK2. The scan signal GW output to the second output terminal 215 may be supplied to the i-th first scan line SL1*i*.

The first signal input terminal 221*a* receives a first input signal FS_Na or GW_Na, the second signal input terminal 222*a* receives a second input signal /FS_Fa or /GW_Fa, and the third signal input terminal 223*a* receives a third input signal FS_Fa or GW_Fa. The first generator 220*a* may output the scan signal GC to the output terminal 224*a* in response to the first input signal FS_Na or GW_Na, the second input signal /FS_Fa or /GW_Fa, and the third input signal FS_Fa or GW_Fa. The scan signal GC output to the output terminal 224*a* may be supplied to the i-th second scan line SL2*i*. Here, a width of the scan signal GC may be determined in response to the first input signal FS_Na or GW_Na, the second input signal /FS_Fa or /GW_Fa, and the third input signal FS_Fa or GW_Fa.

The first signal input terminal 221*b* receives a first input signal FS_Nb or GW_Nb, the second signal input terminal 222*b* receives a second input signal /FS_Fb or /GW_Fb, and the third signal input terminal 223*b* receives a third input signal FS_Fb or GW_Fb. The second generator 220*b* may output the emission control signal EM to the output terminal 224*b* in response to the first input signal FS_Nb or GW_Nb, the second input signal /FS_Fb or /GW_Fb, and the third input signal FS_Fb or GW_Fb. The emission control signal EM output to the output terminal 224*b* may be supplied to the i-th emission control line ELi. Here, a width of the emission control signal EM may be determined in response to the first input signal FS_Nb or GW_Nb, the second input signal /FS_Fb or /GW_Fb, and the third input signal FS_Fb or GW_Fb.

It is to be appreciated that for a subsequent stage STi+1, the scan signal GW output to the second output terminal 215 may be supplied to the i+1-th first scan line SL1*i*+1, the scan signal GC output to the output terminal 224*a* may be supplied to the i+1-th second scan line SL2*i*+1, and the emission control signal EM output to the output terminal 224*b* may be supplied to the i+1-th emission control line ELi+1.

The first input signal FS_Na or GW_Na of the first generator 220*a* may be a signal different from the first input signal FS_Nb or GW_Nb of the second generator 220*b*. For example, the first input signal FS_Na or GW_Na of the first generator 220*a* and the first input signal FS_Nb or GW_Nb of the second generator 220*b* may be output signals of different stage circuits.

The second input signal /FS_Fa or /GW_Fa (and the third input signal FS_Fa or GW_Fa) of the first generator 220*a* may be a signal different from the second input signal /FS_Fb or /GW_Fb (and the third input signal FS_Fb or GW_Fb) of the second generator 220*b*.

For example, the second input signal /FS_Fa or /GW_Fa (and the third input signal FS_Fa or GW_Fa) of the first generator 220*a* and the second input signal /FS_Fb or /GW_Fb) (and the third input signal FS_Fb or GW_Fb) of the second generator 220*b* may be output signals of different stage circuits.

Figure 11:
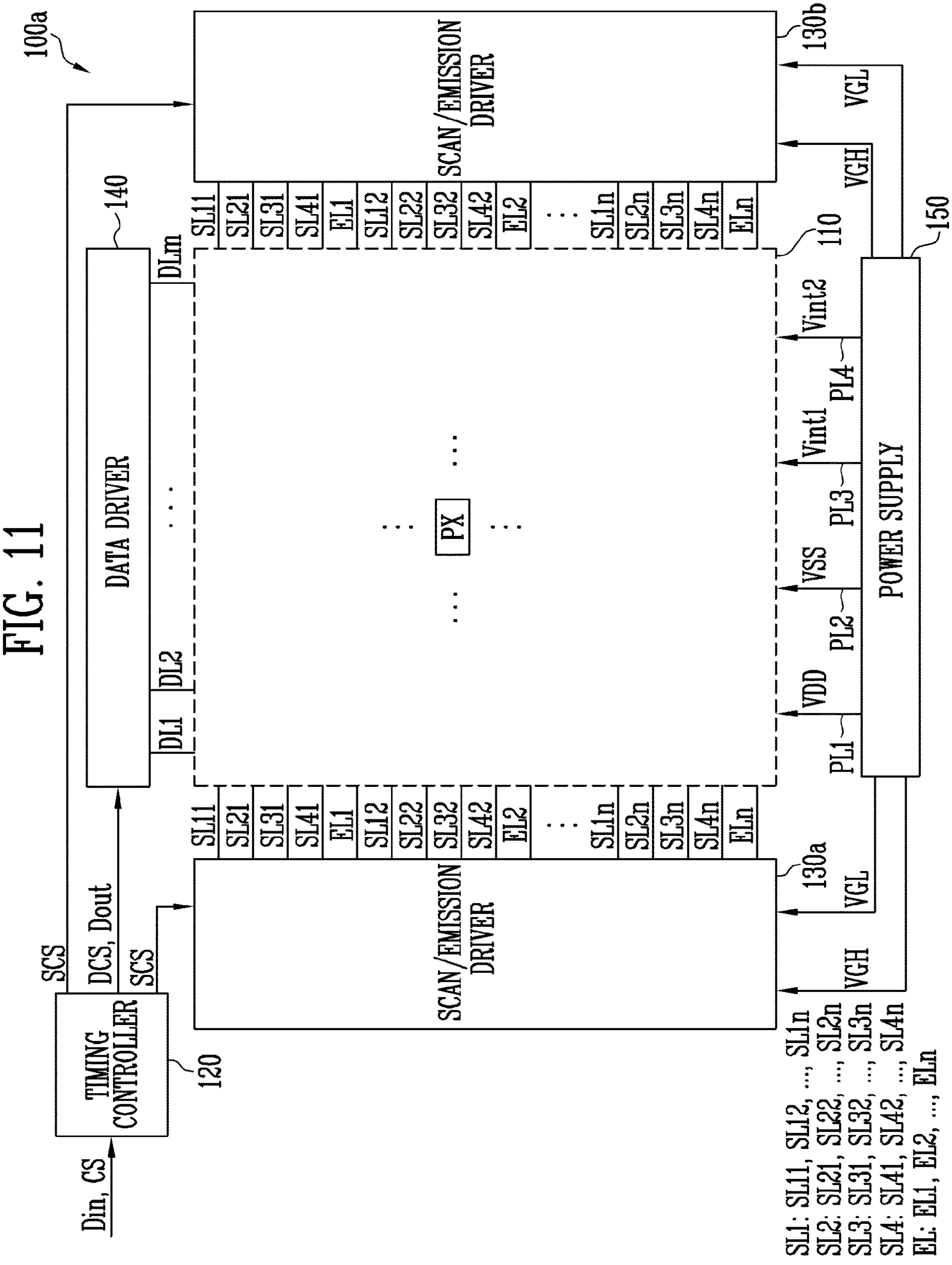
FIG. 11 is a schematic diagram illustrating a display device according to an embodiment of the disclosure.

FIG. 11 is a schematic diagram illustrating a display device according to an embodiment of the disclosure. In case that describing FIG. 11, an overlapping description of the same parts as those in FIG. 5 may be omitted.

Referring to FIG. 11, the display device 100*a* according to an embodiment of the disclosure includes a first scan/emission driver 130*a* and a second scan/emission driver 130*b*. The first scan/emission driver 130*a* may be positioned on one side of the pixel portion 110, supply a scan signal to the scan lines SL1, SL2, SL3, and SL4, and supply an emission control signal to the emission control lines EL. The second scan/emission driver 130*b* may be positioned on another side of the pixel portion 110, supply a scan signal to the scan lines SL1, SL2, SL3, and SL4, and supply an emission control signal to the emission control lines EL.

The first scan/emission driver 130*a* and the second scan/emission driver 130*b* may have substantially the same structure as the scan/emission driver 130 of FIG. 5. Therefore, a detailed description may be omitted.

Figure 12:
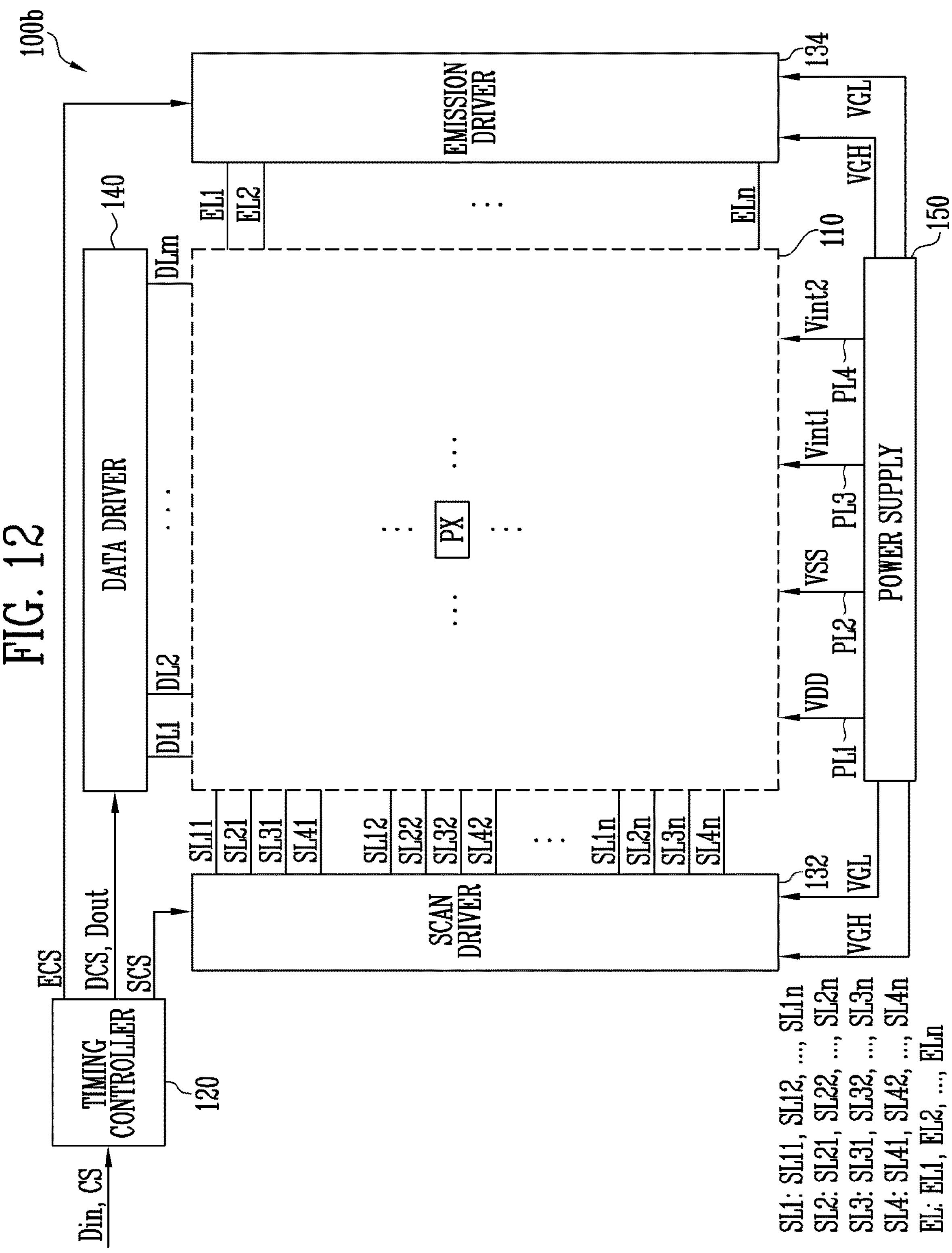
FIG. 12 is a schematic diagram illustrating a display device according to an embodiment of the disclosure.

FIG. 12 is a schematic diagram illustrating a display device according to an embodiment of the disclosure. In case that describing FIG. 12, an overlapping description of the same parts as those in FIG. 5 may be omitted.

Referring to FIG. 12, the display device 100*b* according to an embodiment of the disclosure includes a scan driver 132 positioned on one side of the pixel portion 110 and an emission driver 134 positioned on another side of the pixel portion 110.

The scan driver 132 may receive the first driving control signal SCS from the timing controller 120. The first driving control signal SCS may include the start signal FLM and the clock signals CLK1 and CLK2 required for driving the scan driver 132.

The scan driver 132 may sequentially generate the scan signal while shifting the start signal FLM using the clock signals CLK1 and CLK2. For example, the scan driver 132 may generate the first scan signal GW and the second scan signal GC as shown in FIG. 13.

Figure 16:
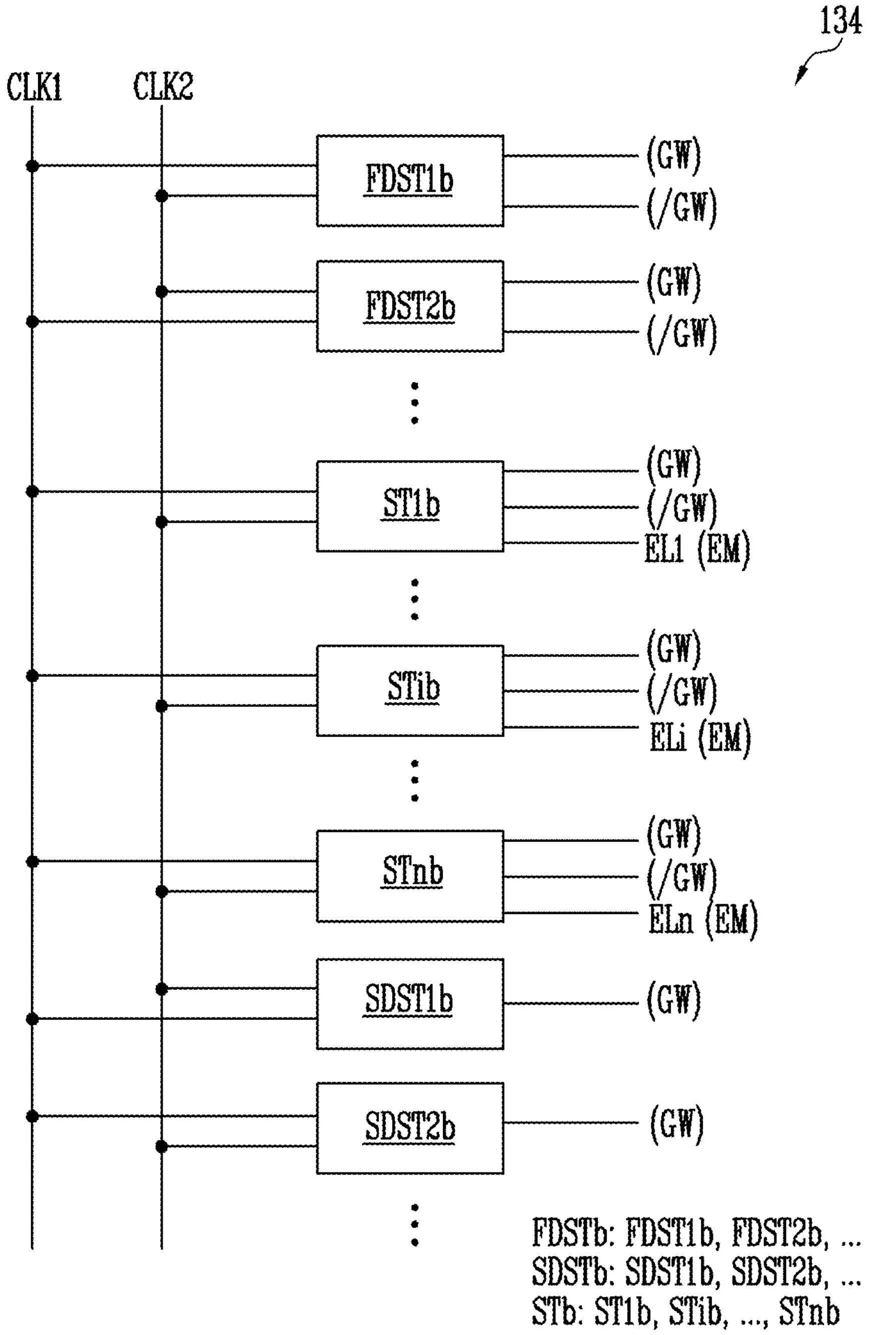
FIG. 16 is a schematic diagram illustrating an embodiment of an emission driver shown in FIG. 12.

The emission driver 134 may receive a third driving control signal ECS from the timing controller 120. The third driving control signal ECS may include the start signal FLM and the clock signals CLK1 and CLK2 required for driving the emission driver 134. The emission driver 134 may sequentially generate the emission control signal while shifting the start signal FLM using the clock signals CLK1 and CLK2. For example, the emission driver 134 may generate the emission control signal EM as shown in FIG. 16.

Figure 13:
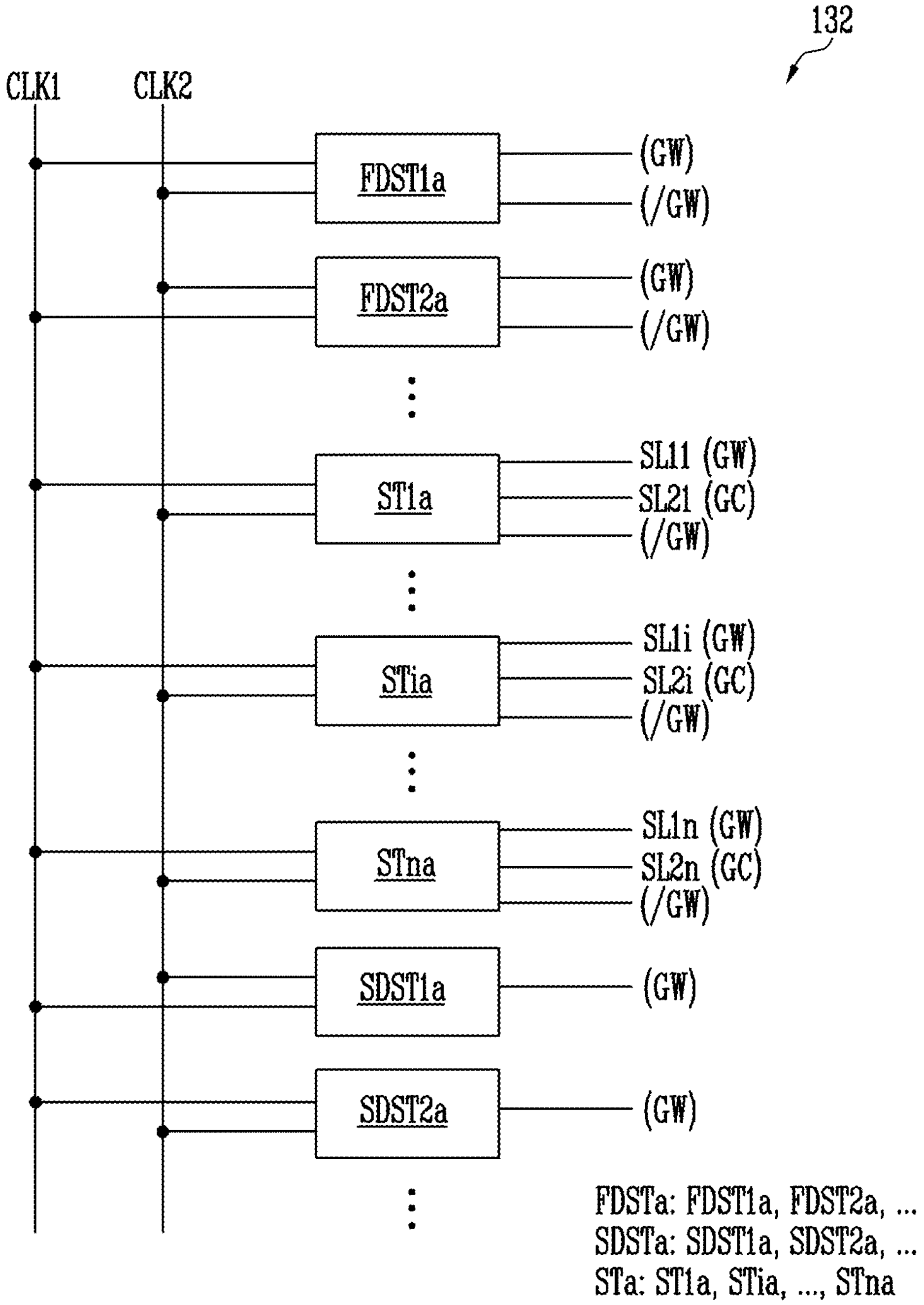
FIG. 13 is a schematic diagram illustrating an embodiment of a scan driver shown in FIG. 12.

FIG. 13 is a schematic diagram illustrating an embodiment of the scan driver shown in FIG. 12.

Referring to FIG. 13, the scan driver 132 according to an embodiment of the disclosure includes multiple first dummy stage circuits FDST1*a*, FDST2*a*, . . . , stage circuits ST1*a*, . . . , STia, STi+1a, . . . , and STna, and second dummy stage circuits SDST1*a*, SDST2*a*, . . . .

Each of the first dummy stage circuits FDSTa, the stage circuits STa, and the second dummy stage circuits SDSTa may have the same structure as the stage circuit 200 shown in FIG. 1. For example, each of the first dummy stage circuits FDSTa, the stage circuits STa, and the second dummy stage circuits SDSTa may include the driver 210 and the generator 220.

The first dummy stage circuits FDSTa may sequentially generate the first scan signal GW (that is, the first signal FS) and the inverted first scan signal /GW (that is, the inverted first signal /FS) while alternately receiving the first clock signal CLK1 and the second clock signal CLK2.

The inverted first scan signal /GW generated in the first dummy stage circuits FDSTa may be used as a second input signal /FS_F of the generator 220 included in any one of the stage circuits STa. The first scan signal GW generated in the first dummy stage circuits FDSTa may be used as a third input signal FS_F of the generator 220 included in any one of the stage circuits STa.

The number of first dummy stage circuits FDSTa may be determined in correspondence with a width of the high level of second scan signal GC. For example, as the width of the second scan signal GC increases, the number of first dummy stage circuits FDSTa may increase.

The second dummy stage circuits SDSTa may sequentially generate the first scan signal GW (that is, the first signal FS) while alternately receiving the first clock signal CLK1 and the second clock signal CLK2.

The first scan signal GW generated in the second dummy stage circuits SDSTa may be used as a first input signal FS_N of the generator 220 included in any one of the stage circuits ST. The number of second dummy stage circuits SDSTa may be determined in correspondence with the width of the high level of second scan signal GC. For example, as the width of the high level of second scan signal GC increases, the number of second dummy stage circuits SDSTa may increase.

The stage circuits STa may generate the first scan signal GW (that is, the first signal FS) and the second scan signal GC (that is, the second signal SS) while alternately receiving the first clock signal CLK1 and the second clock signal CLK2.

Each of the stage circuits STa may generate the first scan signal GW using the driver 210 shown in FIG. 1 and generate the second scan signal GC using the generator 220. An operation process of each of the stage circuits STa may be the same as that of FIG. 1.

Figure 14:
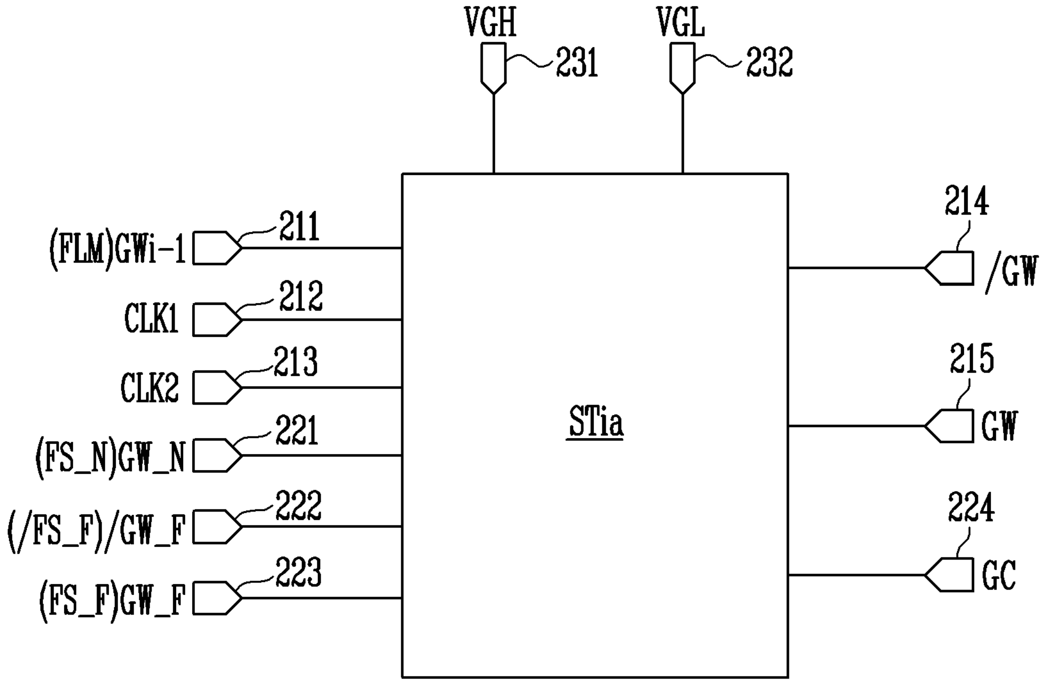
FIG. 14 is a schematic diagram illustrating terminals electrically connected to a stage circuit shown in FIG. 13.
Figure 15:
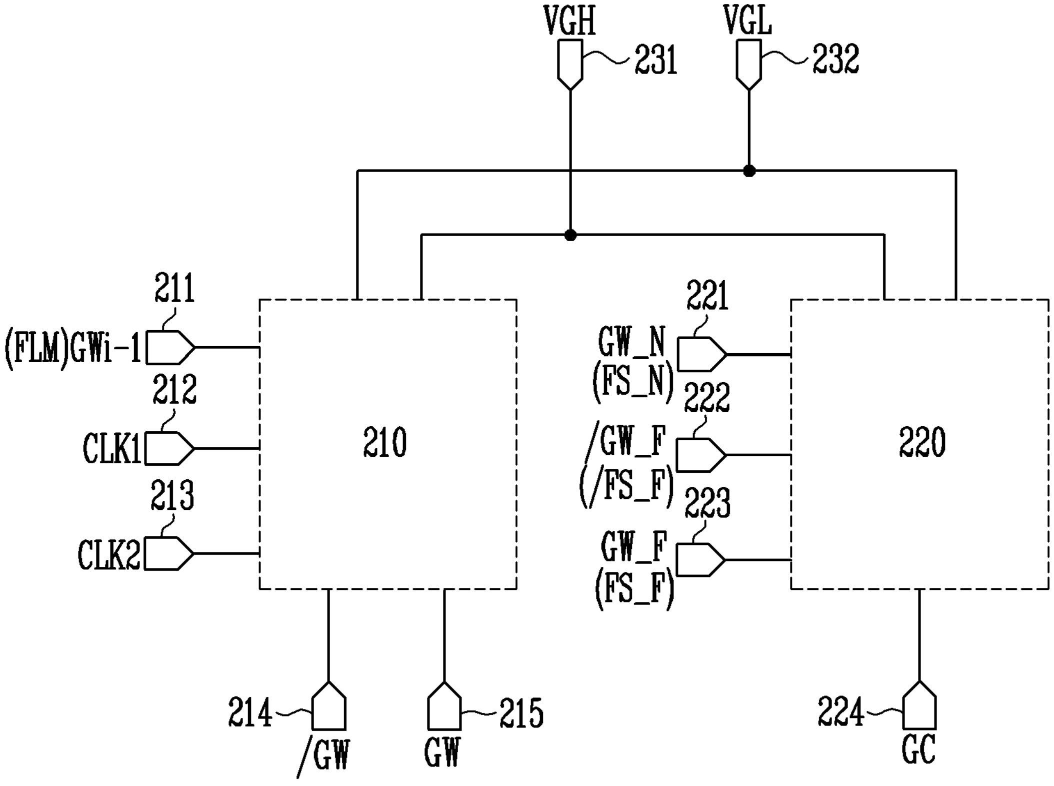
FIG. 15 is a functionally separated schematic diagram of the stage circuit of FIG. 14.

FIG. 14 is a schematic diagram illustrating terminals electrically connected to the stage circuit shown in FIG. 13. FIG. 15 is a functionally separated schematic diagram of the stage circuit of FIG. 14. FIGS. 14 and 15 show the i-th stage circuit STia.

Referring to FIGS. 1, 14, and 15, the stage circuit STia includes the driver 210 and the generator 220. As described above, a configuration of the driver 210 and the generator 220 may be the same as that of the stage circuit 200 shown in FIG. 1.

The stage circuit STia may be electrically connected to a first input terminal 211, a second input terminal 212, a third input terminal 213, a first signal input terminal 221, a second signal input terminal 222, a third signal input terminal 223, a first output terminal 214, a second output terminal 215, an output terminal 224, a first power input terminal 231, and a second power input terminal 232.

The first input terminal 211 receives the start signal FLM (or a scan signal GWi−1 of the previous stage circuit), the second input terminal 212 receives the first clock signal CLK1, and the third input terminal 213 receives the second clock signal CLK2. The driver 210 may output the inverted scan signal /GW to the first output terminal 214 and output the scan signal GW to the second output terminal 215, by using the start signal FLM or GWi−1, the first clock signal CLK1, and the second clock signal CLK2. The scan signal GW output to the second output terminal 215 may be supplied to the i-th first scan line SL1*i*.

The first signal input terminal 221 receives a first input signal FS_N or GW_N, the second signal input terminal 222 receives a second input signal /FS_F or /GW_F, and the third signal input terminal 223 receives a third input signal FS_F or GW_F. The generator 220 may output the scan signal GC to the output terminal 224 in response to the first input signal FS_N or GW_N, the second input signal /FS_F or /GW_F, and the third input signal FS_F or GW_F. The scan signal GC output to the output terminal 224 may be supplied to the i-th second scan line SL2*i*. Here, a width of the scan signal GC may be determined in response to the first input signal FS_N or GW_N, the second input signal /FS_F or /GW_F, and the third input signal FS_F or GW_F.

FIG. 16 is a schematic diagram illustrating an embodiment of the emission driver shown in FIG. 12.

Referring to FIG. 16, the emission driver 134 according to an embodiment of the disclosure includes multiple first dummy stage circuits FDST1*b*, FDST2*b*, . . . , stage circuits ST1*b*, . . . , STib, STi+1b, . . . , and STnb, and second dummy stage circuits SDST1*b*, SDST2*b*, . . . .

Each of the first dummy stage circuits FDSTb, the stage circuits STb, and the second dummy stage circuits SDSTb may have the same structure as the stage circuit 200 shown in FIG. 1. For example, each of the first dummy stage circuits FDSTb, the stage circuits STb, and the second dummy stage circuits SDSTb may include the driver 210 and the generator 220.

The first dummy stage circuits FDSTb may sequentially generate the first scan signal GW (that is, the first signal FS) and the inverted first scan signal /GW (that is, the inverted first signal /FS) while alternately receiving the first clock signal CLK1 and the second clock signal CLK2.

The inverted first scan signal /GW generated in the first dummy stage circuits FDSTb may be used as a second input signal /FS_F of the generator 220 included in any one of the stage circuits STb. The first scan signal GW generated in the first dummy stage circuits FDSTb may be used as a third input signal FS_F of the generator 220 included in any one of the stage circuits STb.

The number of first dummy stage circuits FDSTb may be determined in correspondence with a width of the high level of emission control signal EM. For example, as the width of the emission control signal EM increases, the number of first dummy stage circuits FDSTb may increase.

The second dummy stage circuits SDSTb may generate the first scan signal GW (that is, the first signal FS) while alternately receiving the first clock signal CLK1 and the second clock signal CLK2.

The first scan signal GW generated in the second dummy stage circuits SDSTb may be used as a first input signal FS_N of the generator 220 included in any one of the stage circuits ST. The number of second dummy stage circuits SDSTb may be determined in correspondence the width of the high level of emission control signal EM. For example, as the width of the high level of emission control signal EM increases, the number of second dummy stage circuits SDSTb may increase.

The stage circuits STb may generate the first scan signal GW (that is, the first signal FS) and the emission control signal EM (that is, the second signal SS) while alternately receiving the first clock signal CLK1 and the second clock signal CLK2. The first scan signal GW (and the inverted first scan signal /GW) generated in the stage circuits STb may be supplied to previous stage or next stage circuits without being supplied to an outside.

The emission control signal EM generated in the stage circuits STb may be supplied to the emission control lines EL. For example, the emission control signal EM generated by the i-th stage circuit STib may be supplied to the i-th emission control line ELi. An operation process of each of the stage circuits STb may be the same as that of FIG. 1.

Figure 17:
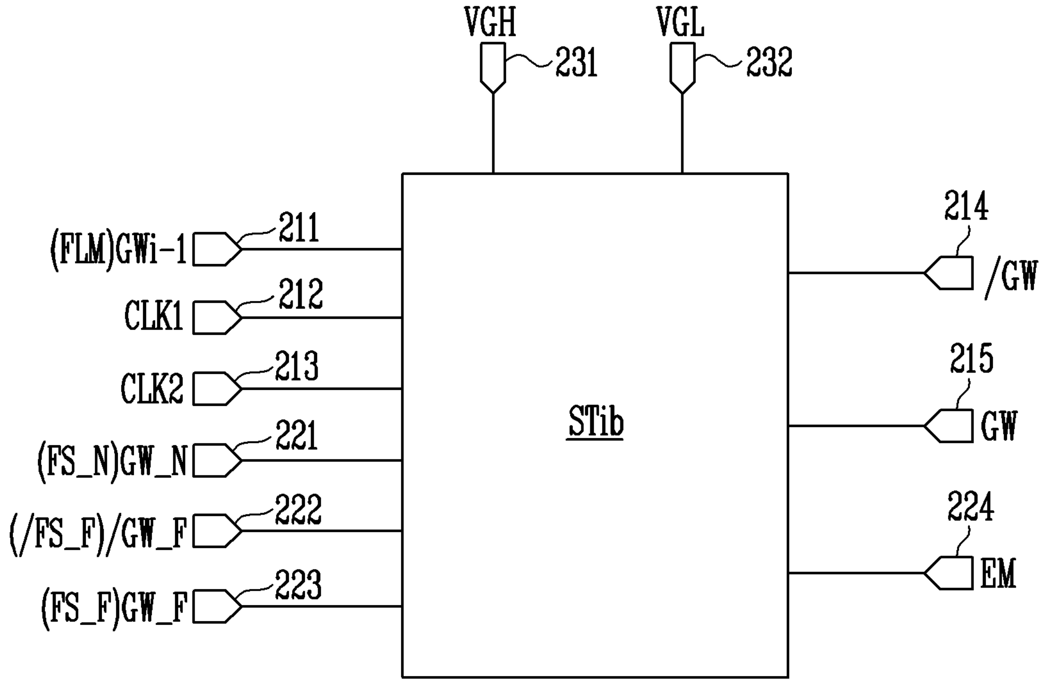
FIG. 17 is a schematic diagram illustrating terminals electrically connected to a stage circuit shown in FIG. 16.
Figure 18:
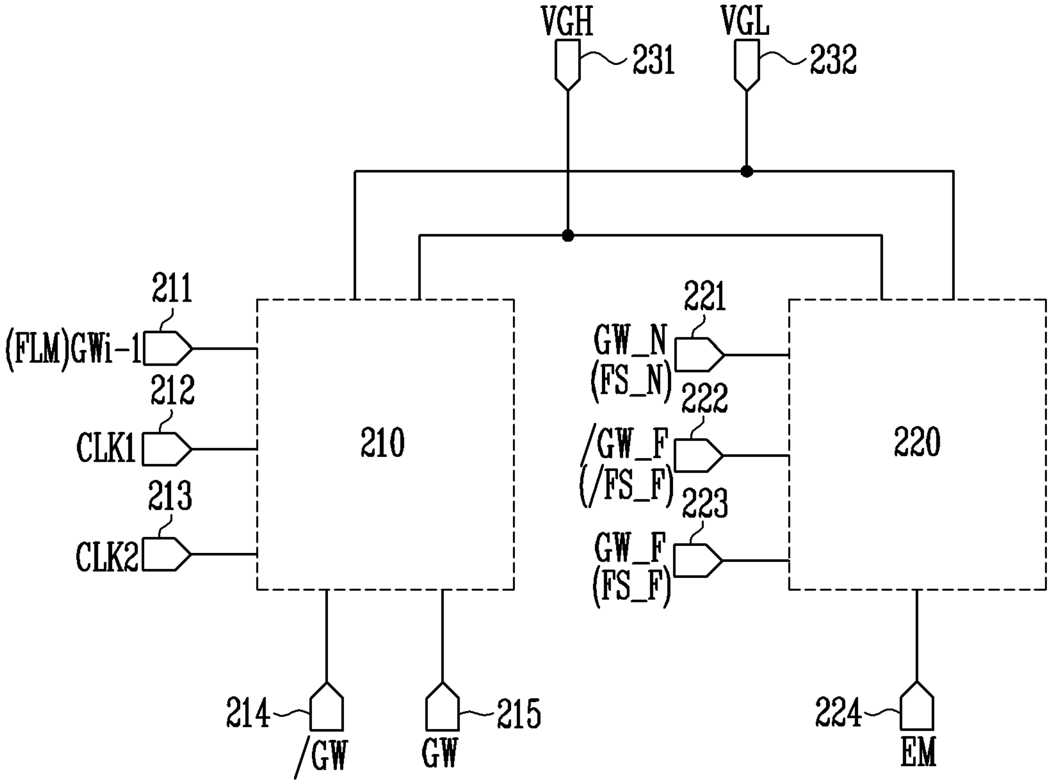
FIG. 18 is a functionally separated schematic diagram of the stage circuit of FIG. 17.

FIG. 17 is a schematic diagram illustrating terminals electrically connected to the stage circuit shown in FIG. 16. FIG. 18 is a functionally separated schematic diagram of the stage circuit of FIG. 17.

Referring to FIGS. 1, 17 and 18, the stage circuit STib includes the driver 210 and the generator 220. As described above, a configuration of the driver 210 and the generator 220 may be the same as that of the stage circuit 200 shown in FIG. 1.

The stage circuit STib may be electrically connected to a first input terminal 211, a second input terminal 212, a third input terminal 213, a first signal input terminal 221, a second signal input terminal 222, a third signal input terminal 223, a first output terminal 214, a second output terminal 215, an output terminal 224, a first power input terminal 231, and a second power input terminal 232.

The first input terminal 211 receives the start signal FLM (or a scan signal GWi−1 of the previous stage circuit), the second input terminal 212 receives the first clock signal CLK1, and the third input terminal 213 receives the second clock signal CLK2. The driver 210 may output the inverted scan signal /GW to the first output terminal 214 and output the scan signal GW to the second output terminal 215, by using the start signal FLM or GWi−1, the first clock signal CLK1, and the second clock signal CLK2. The scan signal GW and the inverted scan signal /GW output from the driver 210 may be supplied to a stage circuit of the previous stage circuit and/or the next stage circuit.

The first signal input terminal 221 receives a first input signal FS_N or GW_N, the second signal input terminal 222 receives a second input signal /FS_F or /GW_F, and the third signal input terminal 223 receives a third input signal FS_F or GW_F. The generator 220 may output the emission control signal to the output terminal 224 in response to the first input signal FS_N or GW_N, the second input signal /FS_F or /GW_F, and the third input signal FS_F or GW_F. The emission control signal EM output to the output terminal 224 may be supplied to the i-th emission control line ELi. Here, a width of the emission control signal may be determined in response to the first input signal FS_N or GW_N, the second input signal /FS_F or/GW_F, and the third input signal FS_F or GW_F.

Figure 19:
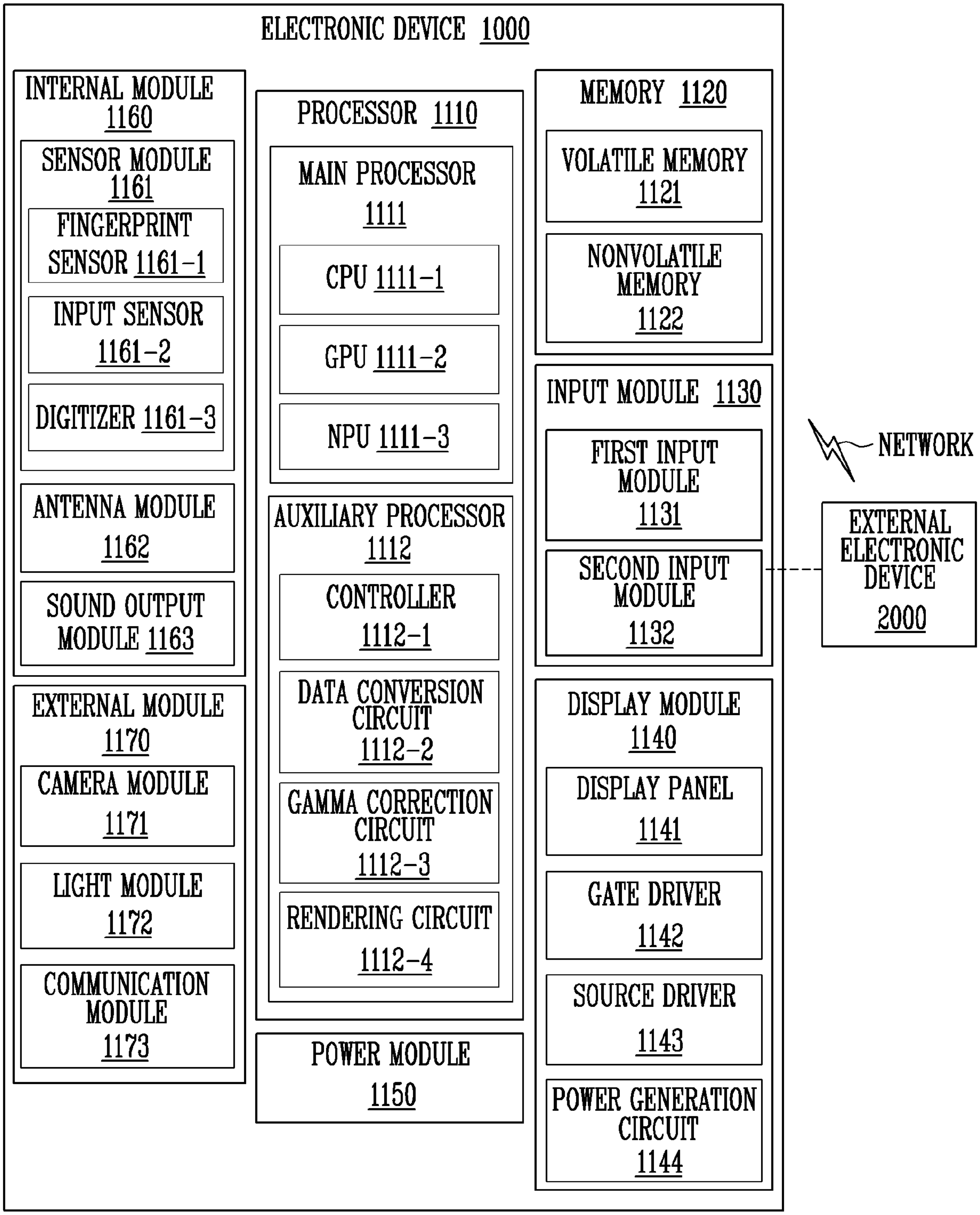
FIG. 19 is a schematic diagram illustrating an electronic device according to an embodiment of the disclosure.

FIG. 19 is a schematic diagram illustrating an electronic device according to an embodiment of the disclosure.

Referring to FIG. 19, the electronic device 1000 outputs various pieces of information through a display module 1140. In case that a processor 1110 executes an application stored in a memory 1120, the display module 1140 provides application information to a user through a display panel 1141.

The processor 1110 obtains an external input through an input module 1130 or a sensor module 1161 and executes an application corresponding to the external input. For example, in case that the user selects a camera icon (or a camera application icon) displayed on the display panel 1141, the processor 1110 obtains a user input through an input sensor 1161-2 and activates a camera module 1171. The processor 1110 transmits image data corresponding to a captured image obtained through the camera module 1171 to the display module 1140. The display module 1140 may display an image corresponding to the captured image through the display panel 1141.

As another example, in case that personal information authentication may be executed in the display module 1140, a fingerprint sensor 1161-1 obtains input fingerprint information as input data. The processor 1110 compares input data obtained through the fingerprint sensor 1161-1 with authentication data stored in a memory 1120 and executes an application according to a comparison result. The display module 1140 may display information executed according to a logic of the application through the display panel 1141. The fingerprint sensor 1161-1 may be disposed to obtain the fingerprint information from the entire area of the display module 1140 (or the display panel 1141).

As still another example, in case that a music streaming icon displayed on the display module 1140 may be selected, the processor 1110 obtains a user input through the input sensor 1161-2 and activates a music streaming application stored in the memory 1120. In case that a music execution command may be input in the music streaming application, the processor 1110 activates a sound output module 1163 to provide sound information corresponding to the music execution command to the user.

In the above, an operation of the electronic device 1000 may be briefly described. Hereinafter, a configuration of the electronic device 1000 may be described in detail. Some of configurations of the electronic device 1000 to be described later may be integrated and provided as one configuration, and one configuration may be separated into two or more configurations and provided.

The electronic device 1000 may communicate with an external electronic device 2000 through a network (for example, a short-range wireless communication network or a long-range wireless communication network). According to an embodiment, the electronic device 1000 may include a processor 1110, a memory 1120, an input module 1130, a display module 1140, a power module 1150, an internal module 1160, and an external module 1170. According to an embodiment, in the electronic device 1000, at least one of the above-described components may be omitted or one or more other components may be added. According to an embodiment, some of the above-described components (for example, the sensor module 1161, an antenna module 1162, or the sound output module 1163) and another component (for example, the display module 1140) may be integral with each other.

The processor 1110 may execute software to control at least another component (for example, a hardware or software component) of the electronic device 1000 electrically connected to the processor 1110, and perform various data processing or operations. According to an embodiment, as at least a portion of the data processing or operation, the processor 1110 may store a command or data received from another component (for example, the input module 1130, the sensor module 1161, or a communication module 1173) in a volatile memory 1121, process the command or the data stored in the volatile memory 1121, and store result data in a nonvolatile memory 1122.

The processor 1110 may include a main processor 1111 and an auxiliary processor 1112. The main processor 1111 may include one or more of a central processing unit (CPU) 1111-1 or an application processor (AP). The main processor 1111 may further include any one or more of a graphic processing unit (GPU) 1111-2, a communication processor (CP), and an image signal processor (ISP). The main processor 1111 may further include a neural processing unit (NPU) 1111-3. The NPU 1111-3 may be a processor specialized in processing an artificial intelligence model, and the artificial intelligence model may be generated through machine learning. The artificial intelligence model may include multiple artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above, but may not be limited to the above-described example. The artificial intelligence model may include a software structure in addition to a hardware structure. At least two of the above-described processing units and processors may be integral with each other (for example, a single chip), or each may be implemented as an independent configuration (for example, multiple chips).

The auxiliary processor 1112 may include a controller 1112-1. The controller 1112-1 may include an interface conversion circuit and a timing control circuit. For example, the controller 1112-1 may include the timing controller 120 shown in FIG. 5, FIG. 11, and/or FIG. 12. The controller 1112-1 receives an image signal from the main processor 1111, converts a data format of the image signal to correspond to an interface specification with the display module 1140, and outputs image data. The controller 1112-1 may output various control signals required for driving the display module 1140.

The auxiliary processor 1112 may further include a data conversion circuit 1112-2, a gamma correction circuit 1112-3, a rendering circuit 1112-4, a touch control circuit which may not be shown, and the like. The data conversion circuit 1112-2 may receive the image data from the controller 1112-1, compensate the image data to display an image with a desired luminance according to a characteristic of the electronic device 1000, a setting of the user, or the like, or convert the image data for reduction of power consumption, afterimage compensation, or the like.

The gamma correction circuit 1112-3 may convert the image data, a gamma reference voltage, or the like so that the image displayed on the electronic device 1000 has a desired gamma characteristic. The rendering circuit 1112-4 may receive the image data from the controller 1112-1 and render the image data in consideration of a pixel disposition or the like of the display panel 1141 applied to the electronic device 1000.

The touch control circuit may supply a touch signal to the input sensor 1161-2 and receive a sensing signal from the input sensor 1161-2 in response to the touch signal.

At least one of the data conversion circuit 1112-2, the gamma correction circuit 1112-3, the rendering circuit 1112-4, and the touch control circuit and another component (for example, the main processor 1111 or the controller 1112-1) may be integral with each other. A source driver 1143 and at least one of the data conversion circuit 1112-2, the gamma correction circuit 1112-3, and the rendering circuit 1112-4 may be integral with each other to be described later.

The memory 1120 may store various data used by at least one component (for example, the processor 1110 or the sensor module 1161) of the electronic device 1000, and input data or output data for a command related thereto. Various setting data corresponding to setting of the user may be stored in the memory 1120. The memory 1120 may include at least one of the volatile memory 1121 and the nonvolatile memory 1122.

The input module 1130 may receive a command or data to be used by a component (for example, the processor 1110, the sensor module 1161, or the sound output module 1163) of the electronic device 1000 from an outside (for example, the user or the external electronic device 2000) of the electronic device 1000.

The input module 1130 may include a first input module 1131 to which a command or data may be input from the user and a second input module 1132 to which a command or data may be input from the external electronic device 2000. The first input module 1131 may include a microphone, a mouse, a keyboard, a key (for example, a button), or a pen (for example, a passive pen or an active pen). The second input module 1132 may support a designated protocol capable of connecting to the external electronic device 2000 by wire or wirelessly. According to an embodiment, the second input module 1132 may include a high definition multimedia interface (HDMI), a universal serial bus (USB) interface, an SD card interface, or an audio interface. The second input module 1132 may include a connector capable of physically connecting to the external electronic device 2000, for example, an HDMI connector, a USB connector, an SD card connector, or an audio connector (for example, a headphone connector).

The display module 1140 visually provides information to the user. The display module 1140 may include the display panel 1141, a gate driver 1142, and the source driver 1143. The display module 1140 may further include a window, a chassis, and a bracket for protecting the display panel 1141. Such a display module 1140 may include the display devices 100, 100*a*, and 100*b* shown in FIG. 5, FIG. 11, and/or FIG. 12.

The display panel 1141 (or a display) may include a liquid crystal display panel, an organic light emitting display panel, or an inorganic light emitting display panel, and a type of the display panel 1141 may not be particularly limited. The display panel 1141 may be a rigid type or a flexible type that may be rolled or folded. The display module 1140 may further include a supporter, a bracket, a heat dissipation member, or the like that supports the display panel 1141.

The display panel 1141 may receive the image data from the auxiliary processor 1112, and may display an image while controlling a current amount supplied from the first driving power VDD to the second driving power VSS via the pixels PX in response to the image data.

The gate driver 1142 may be mounted on the display panel 1141 as a driving chip. The gate driver 1142 and the display panel 1141 may be integral with each other. For example, the gate driver 1142 may include an amorphous silicon TFT gate driver circuit (ASG), a low temperature polycrystalline silicon (LTPS) TFT gate driver circuit, or an oxide semiconductor TFT gate driver circuit (OSG) built in the display panel 1141. The gate driver 1142 receives a control signal from the controller 1112-1 and outputs scan signals to the display panel 1141 in response to the control signal. The gate driver 1142 may include the scan/emission drivers 130, 130*a*, and 130*b* shown in FIGS. 5 and 11 and the scan driver 132 shown in FIG. 12.

The display module 1140 may further include an emission driver. The emission driver outputs an emission control signal to the display panel 1141 in response to the control signal received from the controller 1112-1. The emission driver may be formed separately from the gate driver 1142 or the emission driver and the gate driver 1142 may be integral with each other. The emission driver may include the emission driver 134 shown in FIG. 12.

The source driver 1143 receives a control signal from the controller 1112-1, converts image data into an analog voltage (for example, a data signal) in response to the control signal, and outputs the data signals to the display panel 1141. The source driver 1143 may include the data driver 140 shown in FIG. 5, FIG. 11, and/or FIG. 12.

The source driver 1143 and another component (for example, the controller 1112-1) may be integral with each other. A function of the interface conversion circuit and the timing control circuit of the controller 1112-1 described above and the source driver 1143 may be integral with each other.

The display module 1140 may further include a voltage generation circuit 1144. The voltage generation circuit 1144 may output various voltages required for driving the display panel 1141. For example, the voltage generation circuit 1144 may include the power supply 150 shown in FIG. 5, FIG. 11, and/or FIG. 12.

In an embodiment, the display panel 1141 may include multiple pixel columns each including multiple pixels.

In an embodiment, the source driver 1143 may convert data corresponding to red (R), green (G), and blue (B) included in the image data received from the processor into a red data signal (or data voltage), a green data signal, and the blue data signal, and may provide the red data signal, the green data signal, and the blue data signal to the pixel columns included in the display panel 1141 during one horizontal period.

The power module 1150 supplies power to a component of the electronic device 1000. The power module 1150 may include a battery that charges a power voltage. The battery may include a non-rechargeable primary cell, and a rechargeable secondary cell or fuel cell. The power module 1150 may include a power management integrated circuit (PMIC). The PMIC supplies optimized power to each of the above-described module and a module to be described later. The power module 1150 may include a wireless power transmission/reception member electrically connected to the battery. The wireless power transmission/reception member may include multiple antenna radiators of a coil form.

The electronic device 1000 may further include the internal module 1160 and the external module 1170. The internal module 1160 may include the sensor module 1161, the antenna module 1162, and the sound output module 1163. The external module 1170 may include the camera module 1171, a light module 1172, and the communication module 1173.

The sensor module 1161 may sense an input by a body of the user or an input by a pen among the first input module 1131, and may generate an electrical signal or a data value corresponding to the input. The sensor module 1161 may include at least one of a fingerprint sensor 1161-1, an input sensor 1161-2, and a digitizer 1161-3.

The fingerprint sensor 1161-1 may generate a data value corresponding to a fingerprint of the user. The fingerprint sensor 1161-1 may include any one of an optical type fingerprint sensor or a capacitive type fingerprint sensor.

The input sensor 1161-2 may generate a data value corresponding to coordinate information of the input by the body of the user or the pen. The input sensor 1161-2 generates a capacitance change amount by the input as the data value. The input sensor 1161-2 may sense an input by the passive pen or may transmit/receive data to and from the active pen.

The input sensor 1161-2 may measure a biometric signal such as blood pressure, water, or body fat. For example, in case that the user touches a sensor layer or a sensing panel with a body part and does not move during a certain time, the input sensor 1161-2 may sense the biometric signal based on a change of an electric field by the body part and output information desired by the user to the display module 1140.

The digitizer 1161-3 may generate a data value corresponding to coordinate information of the input by the pen. The digitizer 1161-3 generates an electromagnetic change amount by the input as the data value. The digitizer 1161-3 may sense the input by the passive pen or may transmit/receive data to and from the active pen.

At least one of the fingerprint sensor 1161-1, the input sensor 1161-2, and the digitizer 1161-3 may be implemented as the sensor layer formed on the display panel 1141 through a continuous process. At least one of the fingerprint sensor 1161-1, the input sensor 1161-2, and the digitizer 1161-3 may be disposed above the display panel 1141, and any one of the fingerprint sensor 1161-1, the input sensor 1161-2, and the digitizer 1161-3, for example, the digitizer 1161-3 may be disposed below the display panel 1141.

One sensing panel and at least two of the fingerprint sensor 1161-1, the input sensor 1161-2, and the digitizer 1161-3 may be integral with each other through the same process. In case that a sensing panel and at least two of the fingerprint sensor 1161-1, the input sensor 1161-2, and the digitizer 1161-3 are integral with each other, the sensing panel may be disposed between the display panel 1141 and a window disposed above the display panel 1141. According to an embodiment, the sensing panel may be disposed on the window, and a position of the sensing panel may not be particularly limited.

At least one of the fingerprint sensor 1161-1, the input sensor 1161-2, and the digitizer 1161-3 may be embedded in the display panel 1141. At least one of the fingerprint sensor 1161-1, the input sensor 1161-2, and the digitizer 1161-3 may be simultaneously formed through a process of forming elements (for example, a light emitting element, a transistor, and the like) included in the display panel 1141.

The sensor module 1161 may generate an electrical signal or a data value corresponding to an internal state or an external state of the electronic device 1000. The sensor module 1161 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas for transmitting a signal or power to an outside or receiving a signal or power from an outside. According to an embodiment, the communication module 1173 may transmit a signal to an external electronic device or receive a signal from an external electronic device through an antenna suitable for a communication method. A configuration (for example, the display panel 1141) of the display module 1140 or the input sensor 1161-2 and an antenna pattern of the antenna module 1162 may be integral with each other.

The sound output module 1163 may be a device for outputting a sound signal to an outside of the electronic device 1000, and may include, for example, a speaker used for general purposes such as multimedia playback or recording playback, and a receiver used exclusively for receiving a call. According to an embodiment, the receiver and the speaker may be integral with each other. A sound output pattern of the sound output module 1163 and the display module 1140 may be integral with each other.

The camera module 1171 may capture a still image and a moving image. According to an embodiment, the camera module 1171 may include one or more lenses, an image sensor, or an image signal processor. The camera module 1171 may further include an infrared camera capable of measuring presence or absence of the user, a position of the user, a gaze of the user, and the like.

The light module 1172 may provide light. The light module 1172 may include a light emitting diode or a xenon lamp. The light module 1172 may operate in conjunction with the camera module 1171 or may operate independently.

The communication module 1173 may support establishment of a wired or wireless communication channel between the electronic device 1000 and the external electronic device 2000 and communication performance through the established communication channel. The communication module 1173 may include any one or both of a wireless communication module such as a cellular communication module, a short-range wireless communication module, or a global navigation satellite system (GNSS) communication module, and a wired communication module such as a local area network (LAN) communication module or a power line communication module. The communication module 1173 may communicate with the external electronic device 2000 through a short-range communication network such as Bluetooth, WiFi direct, or infrared data association (IrDA), or a long-range communication network such as a cellular network, the Internet, or a computer network (for example, LAN or WAN). The above-described various types of communication modules 1173 may be implemented as a single chip or as separate chips.

The input module 1130, the sensor module 1161, the camera module 1171, and the like may be used to control an operation of the display module 1140 in conjunction with the processor 1110.

The processor 1110 outputs a command or data to the display module 1140, the sound output module 1163, the camera module 1171, or the light module 1172 based on input data received from the input module 1130. For example, the processor 1110 may generate image data in response to the input data applied through a mouse, an active pen, or the like and output the image data to the display module 1140, or generate command data in response to the input data and output the command data to the camera module 1171 or the light module 1172. In case that the input data may not be received from the input module 1130, the processor 1110 may convert an operation mode of the electronic device 1000 to a low power mode or a sleep mode to reduce power consumed in the electronic device 1000.

The processor 1110 outputs a command or data to the display module 1140, the sound output module 1163, the camera module 1171, or the light module 1172 based on sensing data received from the sensor module 1161. For example, the processor 1110 may compare authentication data applied by the fingerprint sensor 1161-1 with authentication data stored in the memory 1120 and execute an application according to a comparison result. The processor 1110 may execute the command based on sensing data sensed by the input sensor 1161-2 or the digitizer 1161-3 or output corresponding image data to the display module 1140. In case that the sensor module 1161 includes a temperature sensor, the processor 1110 may receive temperature data for a measured temperature from the sensor module 1161 and further perform luminance correction or the like on the image data based on the temperature data.

The processor 1110 may receive measurement data for the presence of the user, the position of the user, the gaze of the user, and the like, from the camera module 1171. The processor 1110 may further perform luminance correction or the like on the image data based on the measurement data. For example, the processor 1110 determining the presence or absence of the user through an input from the camera module 1171 may output image data of which a luminance may be corrected through the data conversion circuit 1112-2 or the gamma correction circuit 1112-3 to the display module 1140.

Some of the above-described components may be electrically connected to each other through a communication method between peripheral devices, for example, a bus, general purpose input/output (GPIO), a serial peripheral interface (SPI), a mobile industry processor interface (MIPI), or an ultra path interconnect (UPI) link to exchange a signal (for example, a command or data) with each other. The processor 1110 may communicate with the display module 1140 through a mutually agreed interface, for example, may use any one of the above-described communication methods, and may not be limited to the above-described communication method.

Although the above has been described with reference to the embodiments of the disclosure, those skilled in the art will understand that the disclosure may be variously modified and changed without departing from the spirit and scope of the disclosure described in the claims.

What is claimed is:

1. A stage circuit comprising:

a driver of a current stage circuit configured to receive a start signal and generate a first signal and an inverted first signal using a first clock signal and a second clock signal; and a first generator of the current stage circuit configured to generate a second signal using a previous stage first signal, which is phase-advanced from the first signal and is supplied from a driver of a previous stage circuit, and a previous stage inverted first signal, which is phase-inverted from the previous stage first signal and is supplied from the driver of the previous stage circuit, and a next stage first signal, which is phase-delayed from the first signal and is supplied from a driver of a next stage circuit, wherein the driver and the first generator are connected to a first power input terminal to which first power is input and a second power input terminal to which second power is input.

2. The stage circuit of claim 1, wherein the first clock signal and the second clock signal have a same period and have opposite phases.

3. The stage circuit of claim 1, wherein the driver comprises:

an input portion configured to control a voltage of a first node using the start signal, the first clock signal, and the second clock signal;

a first output portion connected to the first power input terminal and the second power input terminal and configured to control a voltage of a first output terminal in response to the voltage of the first node; and a second output portion connected to the first power input terminal and the second power input terminal and configured to control a voltage of a second output terminal in response to the voltage of the first output terminal.

4. The stage circuit of claim 3, wherein the first output terminal outputs the inverted first signal, and the second output terminal outputs the first signal.

5. The stage circuit of claim 3, wherein the input portion comprises a first transistor and a second transistor connected in parallel between a first input terminal to which the start signal is input and the first node, a gate electrode of the first transistor is connected to a second input terminal to which the first clock signal is input, and a gate electrode of the second transistor is connected to a third input terminal to which the second clock signal is input.

6. The stage circuit of claim 5, wherein the first transistor is an N-type transistor and the second transistor is a P-type transistor.

7. The stage circuit of claim 3, wherein each of the first output portion and the second output portion is an inverter.

8. The stage circuit of claim 3, wherein the first output portion comprises a third transistor and a fourth transistor connected in series between the first power input terminal and the second power input terminal, the third transistor is a P-type transistor, and the fourth transistor is an N-type transistor, a gate electrode of the third transistor and a gate electrode of the fourth transistor are connected to the first node, and a common node between the third transistor and the fourth transistor is connected to the first output terminal.

9. The stage circuit of claim 3, wherein the second output portion comprises a fifth transistor and a sixth transistor connected in series between the first power input terminal and the second power input terminal, the fifth transistor is a P-type transistor, and the sixth transistor is an N-type transistor, a gate electrode of the fifth transistor and a gate electrode of the sixth transistor are connected to the first output terminal, and a common node between the fifth transistor and the sixth transistor is connected to the second output terminal.

10. The stage circuit of claim 3, further comprising:

a first capacitor connected between the first node and the second power input terminal.

11. The stage circuit of claim 1, wherein the first generator comprises:

a controller configured to control a voltage of a first node using a first input signal supplied to a first signal input terminal and a second input signal supplied to a second signal input terminal; and an output portion outputting the second signal to an output terminal in response to a third input signal supplied to a third signal input terminal and the voltage of the first node.

12. The stage circuit of claim 11, wherein the first input signal is the next stage first signal, the second input signal is the previous stage inverted first signal, and the third input signal is the previous stage first signal.

13. The stage circuit of claim 11, wherein the controller comprises:

a first transistor connected between the first power input terminal and the first node and having a gate electrode connected to the first signal input terminal, the first transistor being P-type; and a second transistor connected between the first node and the second power input terminal and having a gate electrode connected to the second signal input terminal, the second transistor being N-type.

14. The stage circuit of claim 11, wherein the output portion comprises:

a third transistor electrically connected between the first power input terminal and the output terminal and having a gate electrode electrically connected to the third signal input terminal, the third transistor being P-type; and a fourth transistor electrically connected between the output terminal and the second power input terminal and having a gate electrode electrically connected to the first node, the fourth transistor being N-type.

15. The stage circuit of claim 11, wherein the output portion further comprises a second capacitor electrically connected between the first node and the second power input terminal.

16. The stage circuit of claim 1, wherein the first power is set to a high level voltage, and the second power is set to a low level voltage lower than that of the first power.

17. The stage circuit of claim 11, further comprising:

a second generator, the second generator and the first generator comprising a same circuit, wherein the second generator is configured to output a third signal using a fourth input signal input to a fourth signal input terminal, a fifth input signal input to a fifth signal input terminal, and a sixth input signal input to a sixth signal input terminal.

18. The stage circuit of claim 17, wherein the fourth input signal is different from the first input signal, the fifth input signal is different from the second input signal, and the sixth input signal is different from the third input signal.

19. A display device comprising:

a plurality of pixels electrically connected to a plurality of scan lines, a plurality of emission control lines, and a plurality of data lines; and a scan/emission driver comprising:

a plurality of stage circuits configured to drive at least one of the plurality of scan lines and at least one of the plurality of emission control lines, a plurality of first dummy stage circuits positioned at a front stage of the plurality of stage circuits, and a plurality of second dummy stage circuits positioned at a back stage of the plurality of stage circuits, wherein an i-th stage circuit among the plurality of stage circuits comprises:

a driver configured to receive a start signal and generate a first signal and an inverted first signal using a first clock signal, and a second clock signal; and a generator configured to generate a second signal using a previous stage first signal, which is phase-advanced from the first signal and is supplied from a driver of a previous stage circuit and a previous stage inverted first signal, which is phase-inverted from the previous stage first signal and is supplied from the driver of the previous stage circuit, and a next stage first signal, which is phase-delayed from the first signal and is supplied from a driver of a next stage circuit, wherein the start signal is a first signal of an (i-1)-th stage circuit, wherein the first signal is a first scan signal supplied to an i-th first scan line, and wherein the second signal is a second signal supplied to an i-th second scan line or an emission control signal supplied to an i-th emission control line.

20. An electronic device comprising:

a display module comprising a gate driver and a display panel that comprises a plurality of pixels that display an image;

a processor configured to supply data corresponding to the image to the display module;

wherein the gate driver comprises:

a plurality of stage circuits, a plurality of first dummy stage circuits positioned at a front stage of the plurality of stage circuits, and a plurality of second dummy stage circuits positioned at a back stage of the plurality of stage circuits to supply at least one of a scan signal and an emission control signal to the plurality of pixels included in the display panel, an i-th stage circuit among the plurality of stage circuits comprises:

a driver configured to receive a start signal and generate a first signal and an inverted first signal using a first clock signal, and a second clock signal; and a generator configured to generate a second signal using a previous stage first signal, which is phase-advanced from the first signal and is supplied from a driver of a previous stage circuit, and a previous stage inverted first signal, which is phase-inverted from the previous stage first signal and is supplied from the driver of the previous stage circuit, and a next stage first signal, which is phase-delayed from the first signal and is supplied from a driver of a next stage circuit, wherein the start signal is a first signal of an (i-1)-th stage circuit, wherein the first signal is a first scan signal supplied to an i-th first scan line, and wherein the second signal is a second signal supplied to an i-th second scan line or an emission control signal supplied to an i-th emission control line.

* * * * *